United States Patent
Morita

(10) Patent No.: US 10,120,619 B2
(45) Date of Patent: Nov. 6, 2018

(54) PRINTING SYSTEM, APPARATUS SEARCHING METHOD AND NON-TRANSITORY RECORDING MEDIUM STORING APPARATUS SEARCHING PROGRAM

(71) Applicant: Konica Minolta, Inc., Chiyoda-ku, Tokyo (JP)

(72) Inventor: Mitsutaka Morita, Hachioji (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 26 days.

(21) Appl. No.: 15/636,723

(22) Filed: Jun. 29, 2017

(65) Prior Publication Data

US 2018/0004457 A1    Jan. 4, 2018

(30) Foreign Application Priority Data

Jul. 4, 2016   (JP) .................................. 2016-132165

(51) Int. Cl.
   *G06F 3/12*   (2006.01)
   *H04N 1/00*   (2006.01)
   *H04L 29/06*  (2006.01)

(52) U.S. Cl.
   CPC .......... *G06F 3/1203* (2013.01); *G06F 3/1222* (2013.01); *G06F 3/1237* (2013.01);
   (Continued)

(58) Field of Classification Search
   CPC .... G06F 3/1222; G06F 3/1237; G06F 3/1286; G06F 21/123; G06F 2209/502;
   (Continued)

(56) References Cited

U.S. PATENT DOCUMENTS

2001/0046065 A1* 11/2001 Furukawa ............... G06F 3/121
                                                                  358/1.15
2004/0243572 A1* 12/2004 Muto ...................... H04L 41/12
(Continued)

FOREIGN PATENT DOCUMENTS

JP       2001-331392 A    11/2001
JP       2009-289041 A    12/2009

*Primary Examiner* — Chad Dickerson
(74) *Attorney, Agent, or Firm* — Buchanan Ingersoll & Rooney PC

(57) ABSTRACT

A printing system includes a client terminal and information processing apparatus located in a first subnetwork, and a first image forming apparatus located in a second subnetwork. A hardware processor of the information processing apparatus registers address information of the first image forming apparatus, and when receiving a search packet from the client terminal, creates a forwarding packet including information that the search packet has been sent and the address information of the client terminal, on the basis of the search packet, to send the forwarding packet to the address information of the first image forming apparatus. A hardware processor of the first image forming apparatus receives the forwarding packet, extracts the information that the search packet has been sent and the address information of the client terminal from the forwarding packet, and sends a response to the search packet to the address information or the client terminal.

18 Claims, 24 Drawing Sheets

(52) U.S. Cl.
CPC ............ *G06F 3/1286* (2013.01); *H04L 63/08* (2013.01); *H04N 1/0035* (2013.01); *H04N 1/00095* (2013.01)

(58) Field of Classification Search
CPC ..... G01S 5/00; H04L 9/0872; H04L 63/0492; H04L 63/08; H04N 1/00095; H04N 1/0035; H04N 2201/3253
USPC ..... 358/1.11–1.18; 709/201–203; 455/456.1, 455/456.2, 456.6
See application file for complete search history.

(56) References Cited

U.S. PATENT DOCUMENTS

| | | | | |
|---|---|---|---|---|
| 2008/0200118 A1* | 8/2008 | Kubo | ................ | H04N 1/00212 455/14 |
| 2008/0304101 A1* | 12/2008 | Sasase | ................ | G06F 3/1204 358/1.15 |
| 2009/0300175 A1* | 12/2009 | Hayashi | ................ | G06F 3/1288 709/224 |
| 2010/0257271 A1* | 10/2010 | Nakamura | .......... | H04L 61/2015 709/226 |
| 2011/0022632 A1* | 1/2011 | Kishimoto | .......... | H04L 61/2015 707/770 |
| 2011/0164615 A1* | 7/2011 | Ito | ..................... | H04L 29/12113 370/390 |
| 2011/0261405 A1* | 10/2011 | Ito | ......................... | G06F 1/3203 358/1.15 |
| 2012/0036403 A1* | 2/2012 | Nishiyama | .......... | G06F 11/0733 714/57 |
| 2012/0075672 A1* | 3/2012 | Oishi | .................... | G06F 3/1204 358/1.15 |
| 2012/0077515 A1* | 3/2012 | Oishi | .................... | H04W 4/023 455/456.1 |
| 2015/0036584 A1* | 2/2015 | Ushiki | ................... | H04L 67/16 370/315 |

* cited by examiner

FIG. 10

| APPARATUS | POSITION INFORMATION | | DISTANCE FROM TERMINAL | |
|---|---|---|---|---|
| | LAT. | LONG. | LAT. | LONG. |
| TERMINAL 4 | 139°44'28"8869E. | 35°39' 29"1572N. | | |
| MFP1 | 139°44' 28"9369E. | 35°39' 29"1872N. | 0°0' 0" 500 | 0°0' 0" 300 |
| MFP2 | 139°44' 28"9869E. | 35°39' 29"2072N. | 0°0' 0" 1000 | 0°0' 0" 500 |

| APPARATUS | POSITION INFORMATION | | DISTANCE FROM TERMINAL | |
|---|---|---|---|---|
| | LAT. | LONG. | LAT. | LONG. |
| TERMINAL 4 | 139°44' 28"8869E. | 35°39' 29"1572N. | | |
| MFP1 | 139°44' 28"9369E. | 35°39' 29"1872N. | 0°0' 0" 500 | 0°0' 0" 300 |
| MFP2 | 139°44' 28"9869E. | 35°39' 29"2072N. | 0°0' 0" 1000 | 0°0' 0" 500 |
| MFP3 | 139°44' 28"9969E. | 35°39' 29"2272N. | 0°0' 0" 1100 | 0°0' 0" 700 |

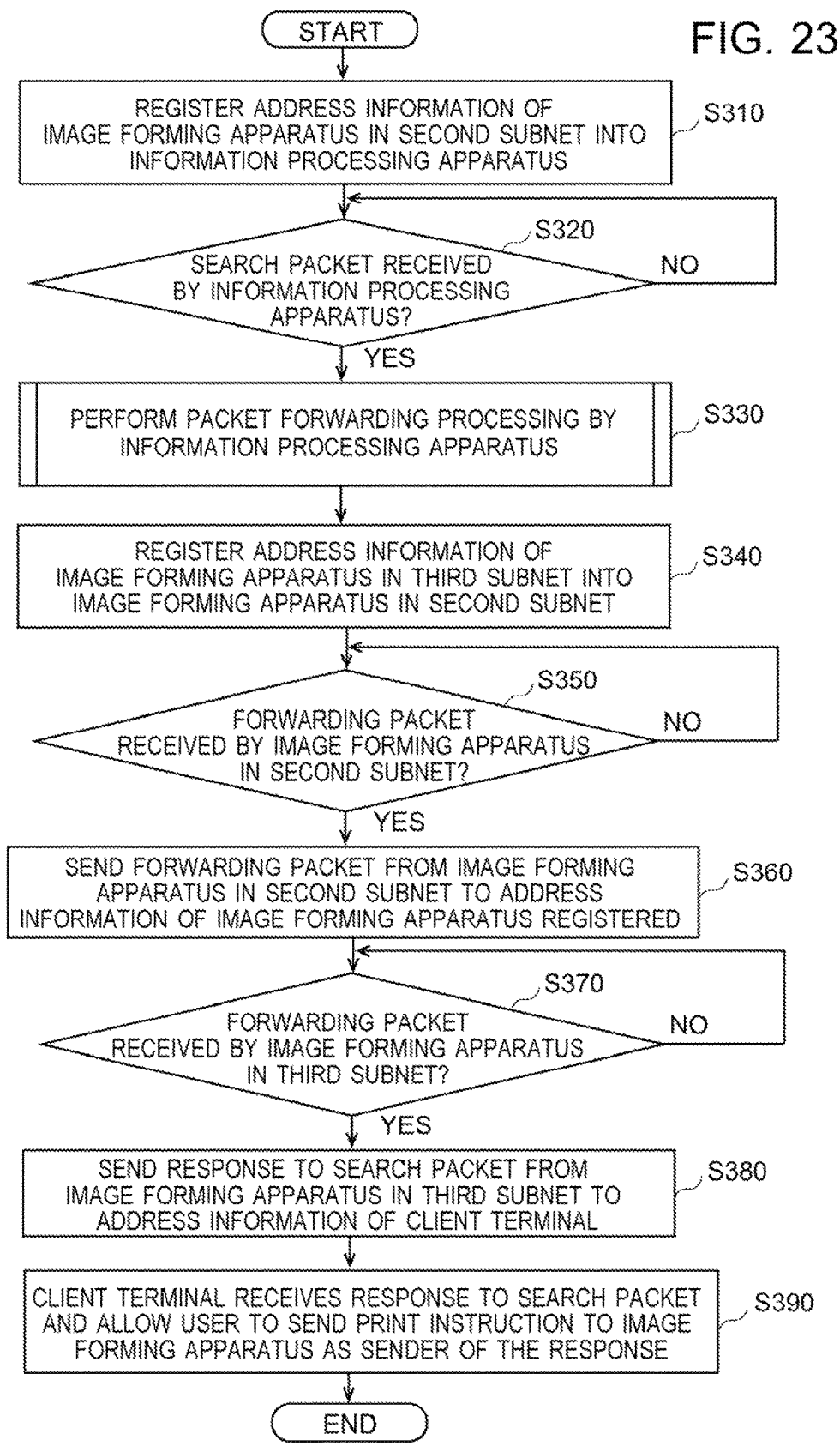

PRINTING SYSTEM, APPARATUS SEARCHING METHOD AND NON-TRANSITORY RECORDING MEDIUM STORING APPARATUS SEARCHING PROGRAM

Japanese Patent Application No. 2016-132165 filed on Jul. 4, 2016, including description, claims, drawings, and abstract, the entire disclosure of which is incorporated herein by reference in its entirety.

TECHNICAL FIELD

The present invention is directed to printing systems, apparatus searching methods and non-transitory recording media each storing an apparatus searching program. In particular, the present invention is directed to a printing system including an information processing apparatus and an image forming apparatus located in respective different subnetworks, at method of searching for an image forming apparatus located in a different subnetwork in the printing system, and non-transitory recording medium storing a computer-readable program for searching for an image forming apparatus in the printing system, to be executed in each of the information processing apparatus and the image forming apparatus.

BACKGROUND

When a terminal like a personal computer or a smart phone gives print instructions to an image forming apparatus like a MFP (Multi-Functional Peripheral) which is connected to the terminal through a network, the terminal needs IP (Internet Protocol) address of the MFP for sending a print job to the MFP. There is a way or system for searching for a MFP located in the same subnetwork (hereinafter, also referred to as a subnet), which is called multicast DNS (Domain Name System). The multicast DNS makes a terminal possible to display a list of MFPs existing in the same subnet, which allows a user to use a desired MFP easily just by selecting it from the list.

However, in a system such that a terminal and a nearby MFP are not located in the same subnet, the terminal may not find the MFP even if using the multicast DNS. There is a method of using a server (DSS: Discovery Service Server) to register and manage MFPs existing in various subnets, which is called BMLinkS (registered trademark). This method makes a terminal possible to search for a MFP in a subnet different from the subnet where the terminal exists, by inquiring of the server the MFP. As another technique which makes it possible to search for a MFP in a subnet different from the subnet where the terminal exists, Japanese Unexamined Patent Publication (JP-A) No. 2009-289041, which corresponds to United States Patent Application Publication No. US2009/0300175A1, discloses a method of preparing servers for respective subnets and making these servers cooperate to send information of MFPs to a terminal.

Moreover, JP-A No. 2001-331392 discloses the following network-device control apparatus. The network-device control apparatus includes a searching section that uses devices connected to a network as a search range with a broadcast packet or a subnet broadcast packet, and searches for a device; a monitoring section that monitors arbitrary packets forwarded in the network; a packet filtering section that extracts a print-job packet from the monitored packets; a determining section that determines whether the forwarding address of the extracted print-job packet is within the subnet where the network-device control apparatus exists; and an adding section that adds a subnet other than the subnet of the network-device control apparatus to the search range on the basis of the determination result.

The BMLinkS makes a terminal possible to search for a MFP existing in a subnet which is different from the subnet where the terminal exists. However, the BMLinkS needs a DSS having a specific function, to be located in a network, and it is not easy to search for a MFP in a different subnet with this technique. The technique disclosed in JP-A No. 2009-289041 (which corresponds to US2009/0300175A1) needs a server to be prepared for each subnet and further needs a terminal, which gives print instructions, to have a function to send search packets to MFPs on the basis of MFP information received from the servers, and it is not easy to search for a MFP in a different subnet with this technique. Furthermore, the technique disclosed in JP-A No. 2001-331392 is given on the assumption that a terminal is always connected to one subnet. Accordingly, since a terminal temporarily linked to a subnet, such as a portable terminal and a terminal at the time of a business trip, cannot monitor packets in advance, the terminal cannot use the above technique. Moreover, similarly to the technique disclosed in JP-A No. JP 2009-289041, the technique disclosed in JP-A No. 2001-331392 needs a terminal to have the above function, and only limited terminals can use the technique.

SUMMARY

The present invention is directed to printing systems, apparatus searching methods and non-transitory recording media each storing an apparatus searching program, which allow a terminal to search for an image forming apparatus in a subnet different from the subnet where the terminal exists, with no need of giving an additional function to the terminal or modifying a function of the terminal, even if the terminal is a terminal temporarily linked to a subnet.

A printing system reflecting one aspect of the present invention is a printing system for use in a network, where the network includes a first subnetwork and a second subnetwork. The printing system comprises: a client terminal located in the first subnetwork; an information processing apparatus located in the first subnetwork; and a first image forming apparatus located in the second subnetwork. The information processing apparatus includes a hardware processor that performs: registering address information of the first image forming apparatus; receiving, from the client terminal, a search packet being a packet for searching for an image forming apparatus in the printing system in a multicast manner; and performing packet forwarding. The packet forwarding includes: obtaining, from the search packet, address information of the client terminal being a sender of the search packet, to create a forwarding packet including information that the search packet has been sent and the address information of the client terminal; and sending the forwarding packet to the address information of the first image forming apparatus. The first image forming apparatus includes a hardware processor that performs: receiving the forwarding packet from the information processing apparatus; and responding to the search packet by extracting the information that the search packet has been sent and the address information of the client terminal from the forwarding packet and by sending a response to the search packet to the address information of the client terminal. The first image forming apparatus further includes a printing unit that prints a print job sent front the client terminal in response to the client terminal receiving the response to the search packet.

An apparatus searching method reflecting one aspect of the present invention is a method of searching for an apparatus in a printing system for use in a network, where the network includes a first subnetwork and a second subnetwork. The printing system comprises a client terminal and information processing apparatus located in the first subnetwork, and a first image forming apparatus located in the second subnetwork. The method comprises: registering address information of the first image forming apparatus by the information processing apparatus; receiving, from the client terminal, a search packet being a packet for searching for an image forming apparatus in the printing system in a multicast manner, by the information processing apparatus; and performing packet forwarding by the information processing apparatus. The packet forwarding includes: obtaining, from the search packet, address information of the client terminal being a sender of the search packet, to create a forwarding packet including information that the search packet has been sent and the address information of the client terminal; and sending the forwarding packet to the address information of the first image forming apparatus. The method further comprises: receiving the forwarding packet from the information processing apparatus, by the first image forming apparatus; responding, by the first image forming apparatus, to the search packet by extracting the information that the search packet has been sent and the address information of the client terminal from the forwarding packet and by sending a response to the search packet to the address information of the client terminal; and allowing, by the client terminal, a user to send a print instruction to the first image forming apparatus, in response to the client terminal receiving the response to the searching packet from the first image forming apparatus.

A non-transitory recording medium reflecting one aspect of the present invention stores a computer-readable program for searching for an apparatus in a printing system. The printing system is for use in a network including a first subnetwork and a second subnetwork, and the printing system comprises a client terminal and information processing apparatus located in the first subnetwork and a first image forming apparatus located in the second subnetwork. The program comprises instructions which, when executed by a hardware processor of the information processing apparatus, cause the information processing apparatus to perform the following operations. The operations comprise: registering address information of the first image forming apparatus; receiving, from the client terminal, a search packet being a packet for searching for an image forming apparatus in the printing system in a multicast manner; and performing packet forwarding. The packet forwarding includes: obtaining, from the search packet, address information of the client terminal being a sender of the search packet, to create a forwarding packet including information that the search packet has been sent and the address information of the client terminal; and sending the forwarding packet to the address information of the first image forming apparatus.

A non-transitory recording medium reflecting one aspect of the present invention stores a computer-readable program for searching for an apparatus in a printing system. The printing system is for use in a network including a first subnetwork and a second subnetwork, and the printing system comprises a client terminal and information processing apparatus located in the first subnetwork, and a first image forming apparatus located in the second subnetwork. The program compose instructions which, when executed by a hardware processor of the first image forming apparatus, cause the first image forming apparatus to perform the following operations, the operations comprise receiving a forwarding packet from the information processing apparatus, wherein the forwarding packet is created by the information processing apparatus in response to receiving, from the client terminal, a search packet being a packet for searching for an image forming apparatus in the printing system in a multicast manner, and the forwarding packet includes information that the search packet has been sent and the address information of the client terminal. The operations further comprise responding to the search packet by extracting the information that the search packet has been sent and the address information of the client terminal from the forwarding packet and by sending a response to the search packet to the address infuriation of the client terminal.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein:

FIG. 10 illustrates an example of a table of position information to be used for apparatus searching processing in a printing system according to one embodiment of the present invention;

FIG. 23 is a flowchart illustrating another example of an apparatus searching method for use in a printing system according to one embodiment of the present invention.

DETAILED DESCRIPTION OF EMBODIMENTS

Hereinafter, one or more embodiments of the present invention will be described with reference to the drawings. However, the scope of the invention is not limited to the illustrated embodiments.

Figures 17, 18:
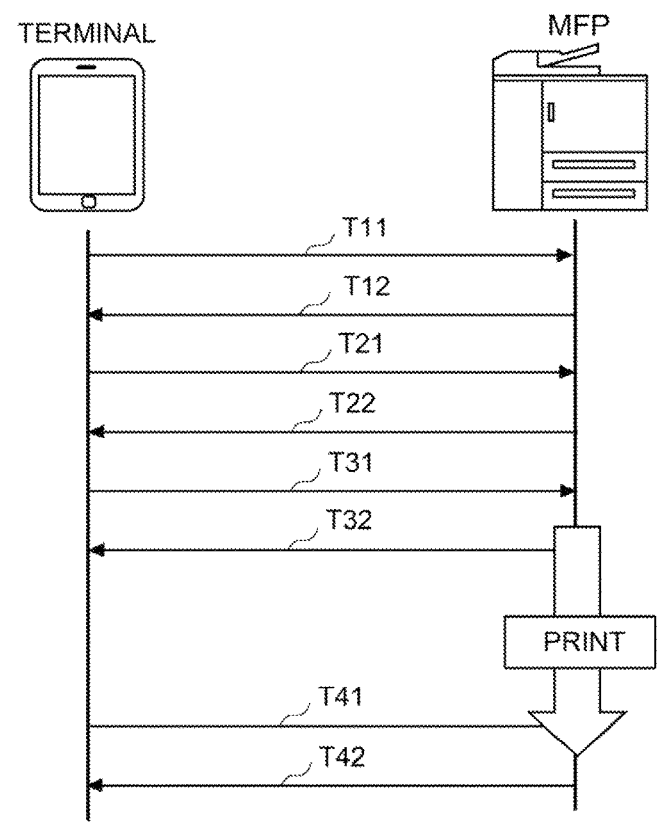
FIG. 17 illustrates an example of a table of position information to be used for apparatus searching processing in a printing system according to one embodiment of the present invention.
FIG. 18 is a schematic diagram for describing multicast DNS.

As described in the above BACKGROUND, when a terminal like a personal computer or a smart phone gives print instructions to an image forming apparatus like a MFP which is connected to the terminal through a network, a technique called multicast DNS to search for a MFP in the same subnet is used. FIG. 18 is a schematic diagram for describing the multicast DNS. When a terminal searches for an apparatus in a printing system (T11 in FIG. 18), a MFP sends the terminal a destination URI (Uniform Resource Identifier) in IPP (Internet Printing Protocol) and information of a part of the abilities, in response to the search instructions (T12). In response to the terminal sending a request for the abilities to the MFP (T21), the MFP sends information of the abilities with the IPP Attributes to the terminal (T22). In response to the terminal sending as print job to the MFP (T31), the MFP acknowledges the print job (T32), and then executes printing. In response to the terminal sending a request for the status to the MFP (T41), the MFP sends the status with the IPP Attributes to the terminal (T42).

Figure 19:
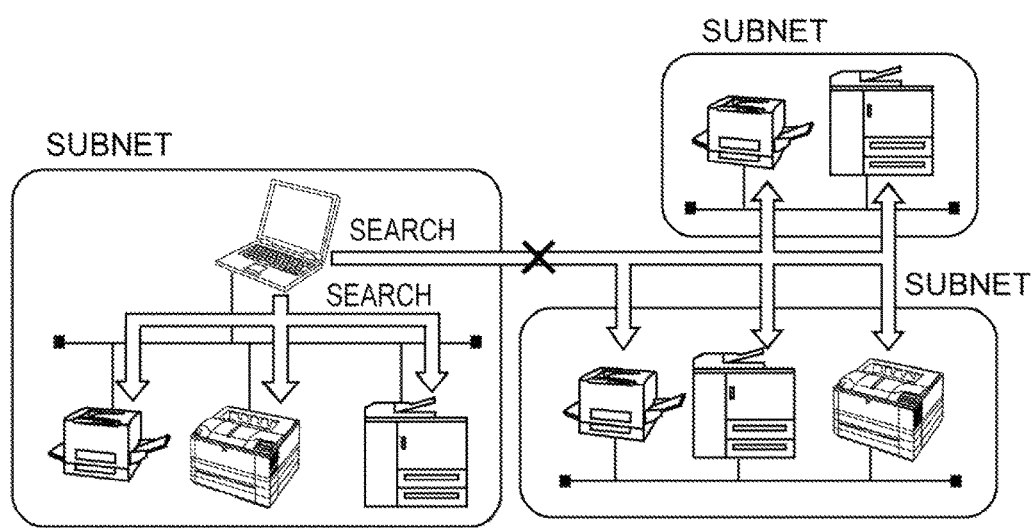
FIG. 19 is a schematic diagram for describing the multicast DNS.

The multicast DNS makes the terminal possible to display a list of MFPs found in the same subnet, which allows a user to use a desired MFP easily just by selecting it from the list. However, in a system such that a terminal and a nearby MFP are not located in the same subnet, the terminal may not find the MFP in the system even if using the multicast DNS. FIG. 19 schematically illustrates a system such that a terminal cannot find MFPs located in other subnets by using the multicast DNS. In FIG. 19, an area enclosed with a round rectangle indicates a subnet. The terminal can find MFPs in the subnet where the terminal exists, by multicast searching, but cannot find MFPs in other subnets since multicast packets do not reach other subnets (see the X sign in FIG. 19).

Figure 20:
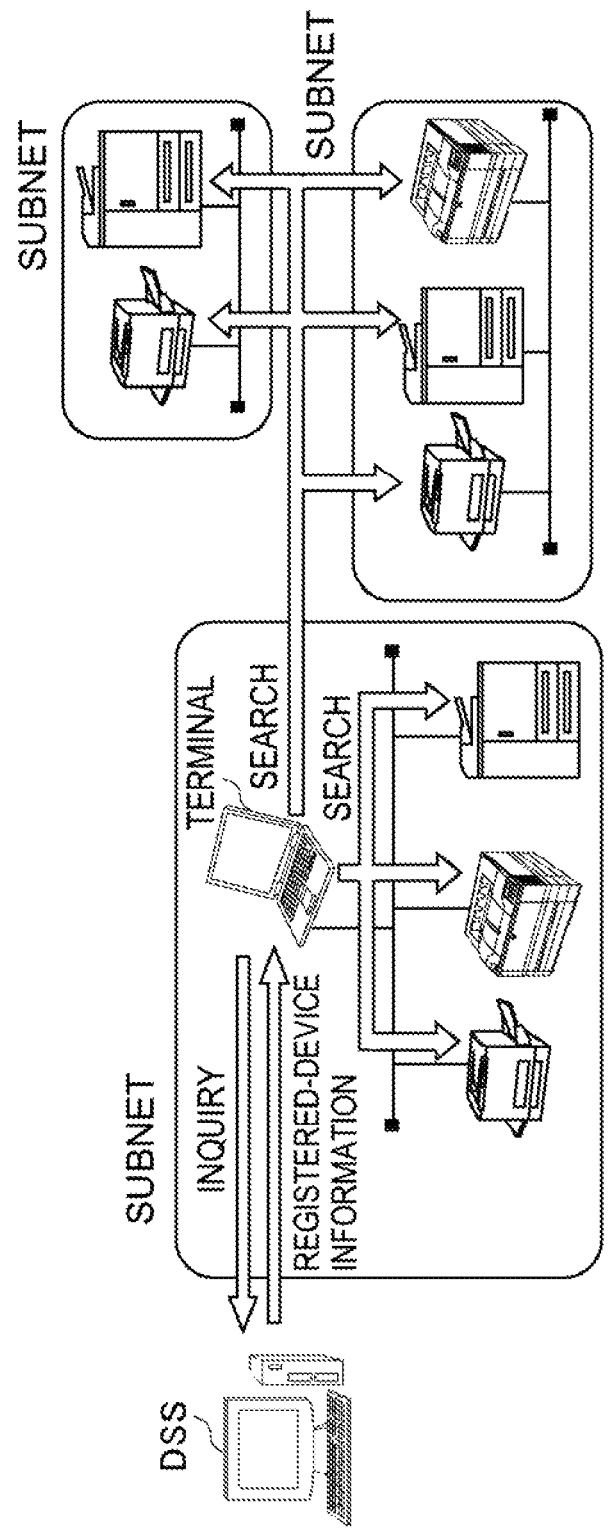
FIG. 20 is a schematic diagram for describing BMLinkS.

As a method for searching for a MFP in a subnet different from the subnet where the terminal exists, there is another technique called BMLinkS. FIG. 20 is a schematic diagram for describing the BMLinkS. In the BMLinkS, there is provided a server (DSS) that registers and manages MFPs existing in various subnets. When a terminal inquires of a DSS about apparatuses in the system, the DSS sends information of registered apparatuses to the terminal in response to the inquiry, whereby the terminal can search for MFPs in other subnets. However, the technique needs MFPs to be registered into a server in advance and needs the terminal to be subjected to server-connection setting. Accordingly, the technique requires a lot of time and effort and is not easy to use.

Figure 21:
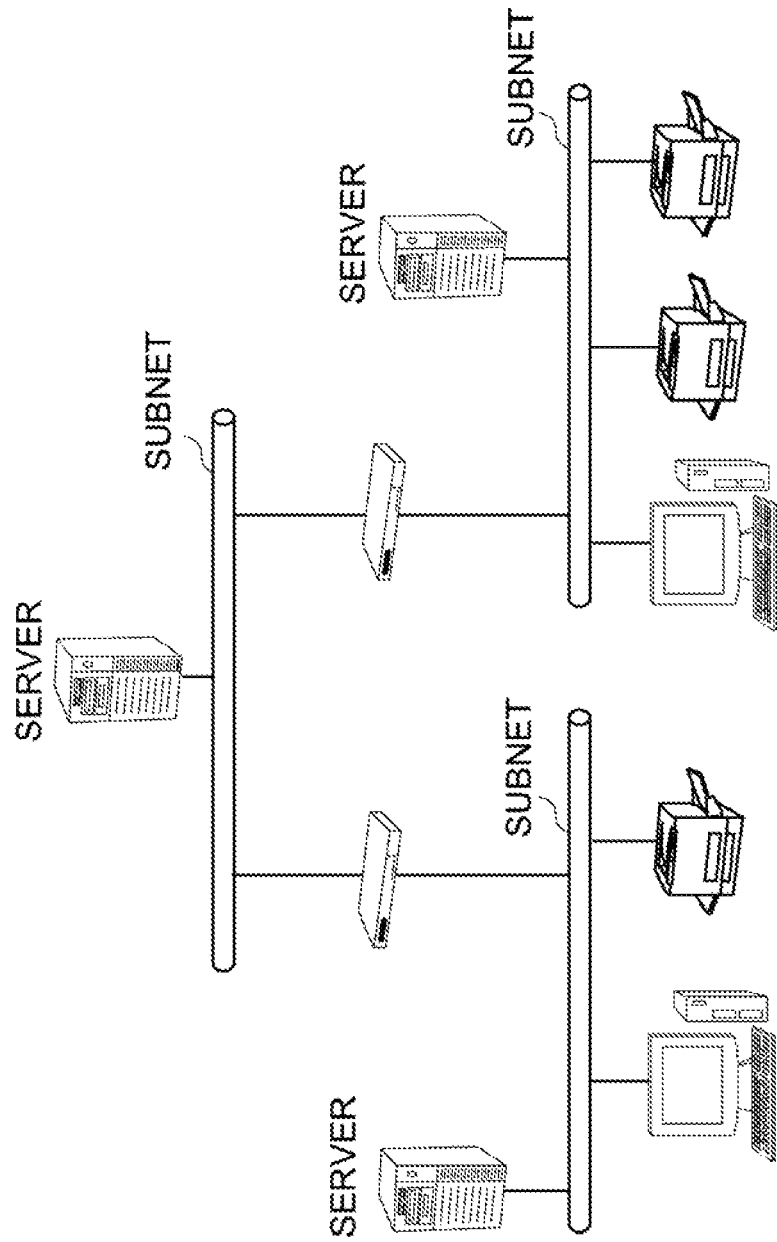
FIG. 21 is a schematic diagram for describing a network system disclosed in JP-A No. 2009-289041.

As illustrated in FIG. 21, another technique has also be proposed that prepares servers for respective subnets and causes the servers to send information of MFPs to a terminal by making the servers cooperate (refer to JP-A No. 2009-289041, which corresponds to US2009/0300175A1). However, this technique needs a server to be prepared for each subnet and further needs a terminal to have a function to send search packets to MFPs on the basis of MFP information received from the servers. Another technique has also be proposed that causes a terminal to monitor packets in a network, acquire IP addresses of MFPs in other subnets on the basis of print instructions given by other terminals, and search for a MFP by sending search packets to not only to MFPs in the subnet where the terminal exists but also to MFPs in other subnets with reference to the IP addresses obtained (refer to JP-A No. 2001-331392). However, since this technique assumes that a terminal is always connected on one subnet, a terminal temporarily connected to a subnet, such as a mobile terminal and a terminal at the time of a business trip cannot use this technique. Moreover, the technique needs a terminal to have the above function, and only limited terminals can use the technique.

In view of that, there is proposed an apparatus searching method for use in a printing system as one embodiment of the present invention. The printing system includes a client terminal and an information processing apparatus (for example, an image forming apparatus or a network device) located in a certain subnetwork in a network and further includes an image forming apparatus located in another subnetwork in the network. The information processing apparatus forwards a packet (a search packet) for searching for an image forming apparatus in the printing system in a multicast manner, to the image forming apparatus in another subnetwork. The information processing apparatus for forwarding a search packet can be an arbitrary device including a hardware processor and capable of monitoring packets in the network continuously. In an example of the apparatus searching method illustrated in FIGS. 1A to 1D, a printing system includes plural image forming apparatuses (in this example, MFP1, MFP2 and printer located in subnets (in this example, subnet A and subnet B) in the network, and MFP2 in subnet B is assumed to be the information processing apparatus for forwarding a search packet. In the example of FIGS. 1A to 1D, data communications between apparatuses located in different subnets are conducted through a router located in the network. A detailed description is given of the example. In advance to searching for an apparatus in the printing system, address information (IP address) of MFP1 in subnet A is registered into MFP2 in subnet B. There are four methods for registering address information (an IP address). The first method is a method of registering address intimation by monitoring packets in a network. That is, when a print job to instruct printing to MFP1 is sent, MFP2 detects a packet of the print job, and registers the IP address of the destination of the print job. The second method is a method of registering address information in response to receiving a registration request from a MFP. That is, upon receipt of a registration request from MFP1, MFP2 registers the IP address of MFP1. The third method is a method of registering the IP address of MFP1 into MFP2 manually by an operator. The fourth method is a method of inquiring of other terminals in the same subnet (in this example, printer 1 and terminals 3 to 5 in subnet B) about known MFPs.

Figure 1A:
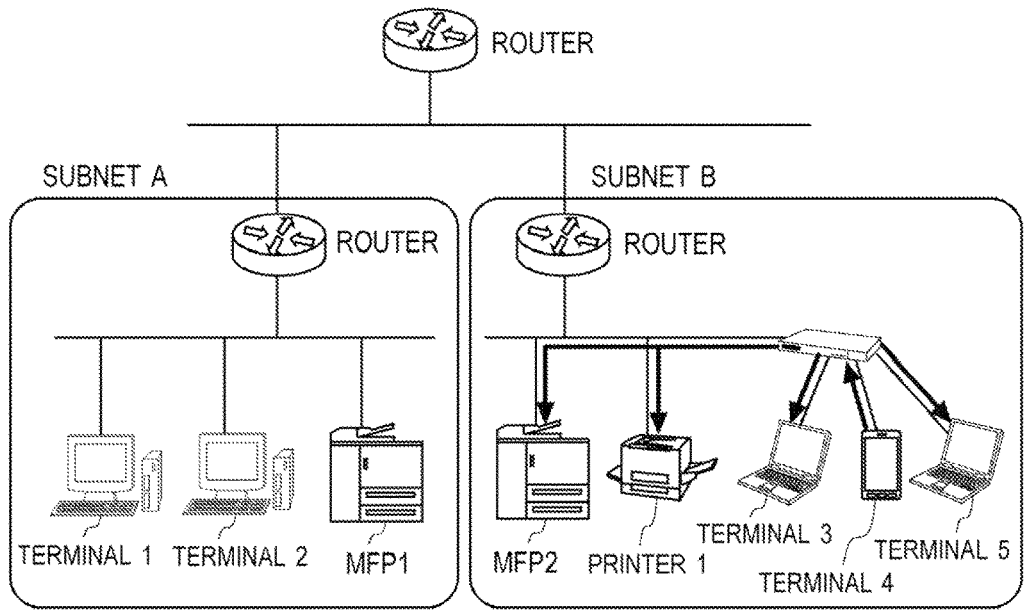
FIGS. 1A to 1D are schematic diagrams for describing an apparatus searching method for use in a printing system according to one embodiment of the present invention.

Next, as illustrated in FIG. 1A, when a terminal (in this example, terminal 4 in subnet B) sends a search packet, which is a packet for searching for an image forming apparatus in the network, to the network in a multicast manner, the search packet is sent to each of all the apparatuses (MFP2, printer 1, terminal 3 and terminal 5) in subnet B (see the thick arrows in FIG. 1A).

Figure 1B:
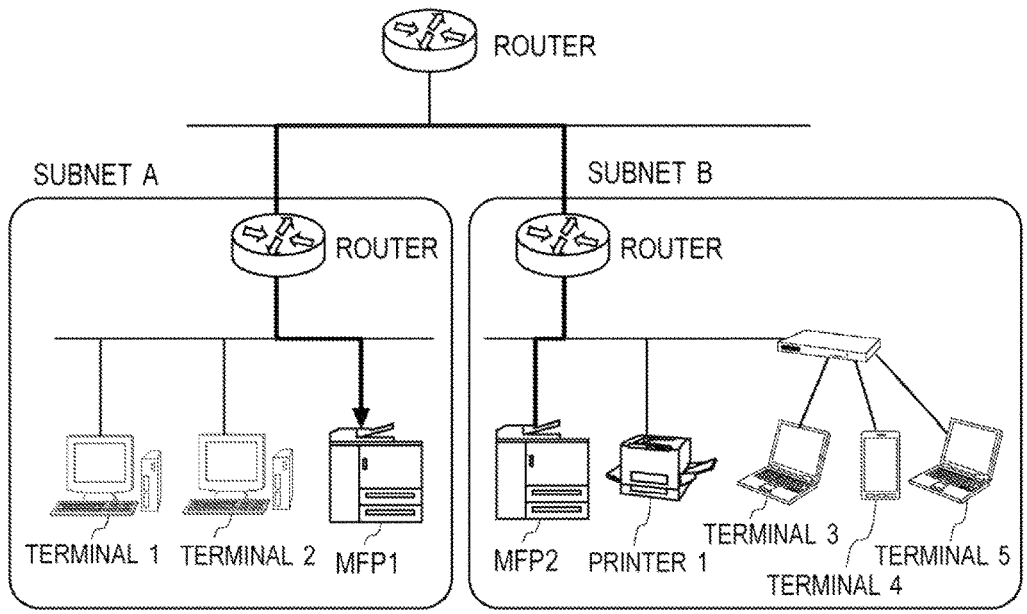

Next, as illustrated in FIG. 1B, in response to receiving a search packet, MFP2 in subnet B forwards the search packet to MFP1 in subnet A. In other words, in response to receiving a search packet, which is a packet for searching for an image forming apparatus in the printing system in a multicast manner, from terminal 4, MFP2 obtains from the search packet the IP address of terminal 4 being a sender of the search packet, to create a packet (referred to as a forwarding packet) which includes information that the search packet has been sent and the address information of the sender of the search packet (terminal 4) so as to notify the information to the destination of the forwarding packet. MFP2 then sends the forwarding packet to the IP address of MFP1 subnet A, which was registered (see thick arrows in FIG. 1B).

Figure 1C:
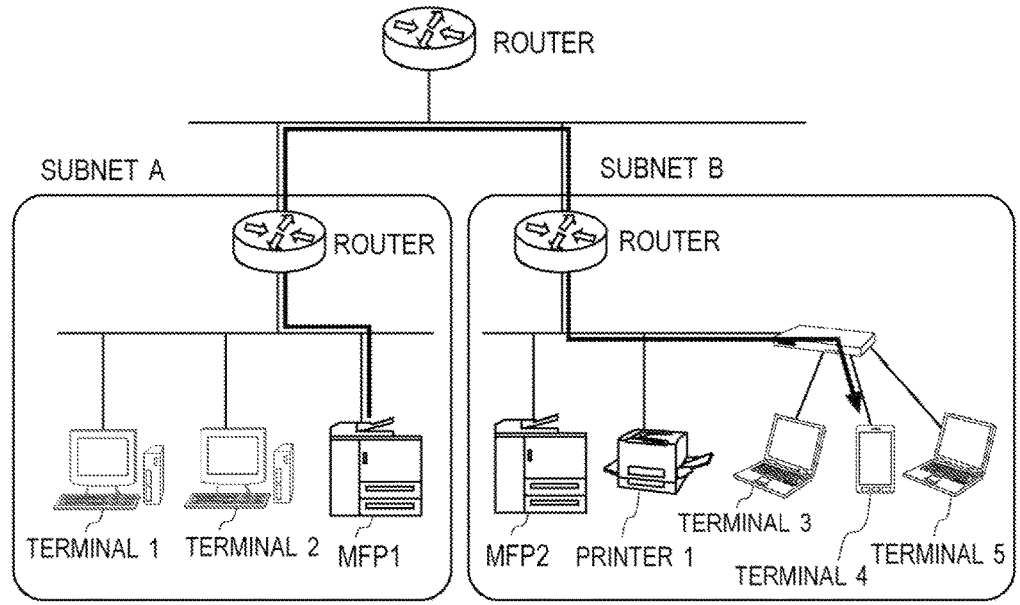

Next, as illustrated in FIG. 1C, in response to receiving the forwarding packet, MFP1 in subnet A extracts from the forwarding packet the information that the search packet has been sent and the IP address of the sender of the search packet (terminal 4). Then, MFP1 sends a response to the search packet to the IP address of terminal 4 (see the thick arrows in FIG. 1C), thereby responding to terminal 4 as if MFP1 has received the search packet directly from terminal 4. When terminal 4 receives the response to the search packet from MFP1 in subnet A, terminal 4 displays MFP1 in subnet A together with other image forming apparatuses which have been found, as a search result of an image forming apparatus in the network. It allows a user to send print instructions to MFP1 subnet A through terminal 4 in subnet B. Accordingly, the above-mentioned method allows a terminal which gives print instructions to easily search for a MFP in a subnet different from the subnet where the terminal exists, without gives an additional function (for example, a function to inquire of a server about a MFP in a subnet different from the subnet where the terminal exists) to the terminal or modifying a function of the terminal. Moreover, the above-mentioned method allows a terminal, even if the terminal is a terminal temporarily connected to a network, such as a mobile terminal and a terminal at the time of a business trip, to search for a MFP in a different subnet similarly to a MFP in the terminal exists.

Figure 1D:
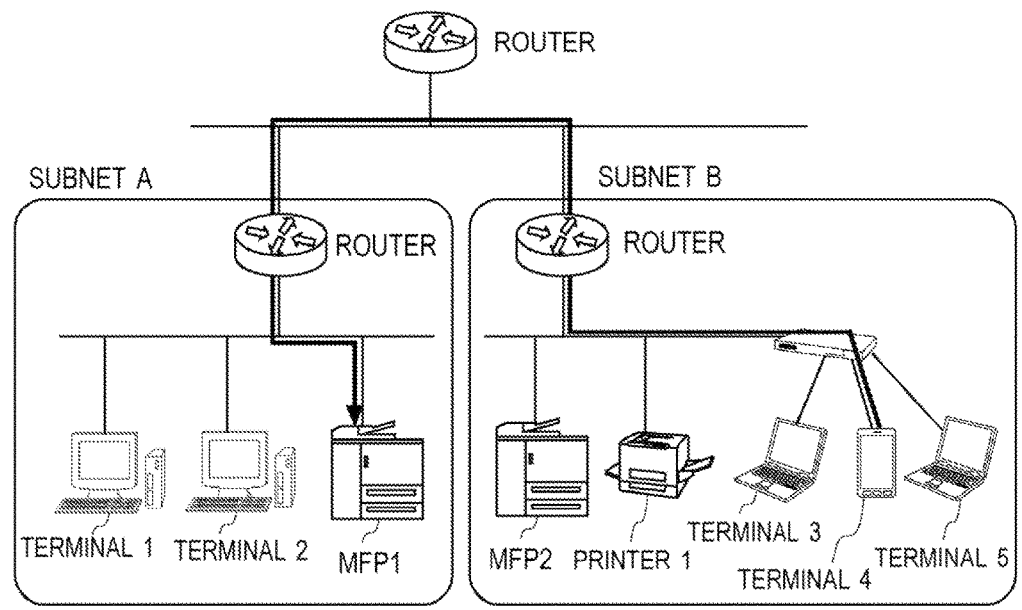

Subsequently, as illustrated in FIG. 1D, terminal 4 in subnet B gives print instructions to MFP1 in subnet A (see the thick arrows in FIG. 1D), and MFP1 in subnet A then executes printing in response to the print instructions (for example, a print job) given by terminal 4 in subnet B.

In this way, when MFP2 in subnet B receives a search packet sent in a multicast manner by a terminal (terminal 4) in the subnetwork (subnet B) where MFP2 exists, MFP2 obtains from the search packet the IP address of the terminal (terminal 4 in subnet B) being the sender of the search packet. MFP2 then sends a forwarding packet which includes information that the search packet has been sent and the IP address of the terminal (terminal 4 in subnet B) being the sender of the search packet, to the IP address of the MFP in another subnet (MFP1 in subnet A) which has been registered in advance. When the MFP in another subnet (MFP1 in subnet A) receives the forwarding packet, the MFP extracts, from the forwarding packet, the information that the search packet has been sent and the IP address of the terminal (terminal 4 in subnet B) being the sender of the search packet, and sends a response to the search packet to the IP address of the terminal (terminal 4 in subnet B) being the sender of the search packet. It allows a user to give print instructions to a MFP in a subnet different from the subnet where the terminal exists, though the terminal, similarly to a system that a terminal can send a search packet across the boundary of a subnet. It further allows a user to give print instructions to a desired MFP (for example, a MFP closest to the terminal) through the terminal, regardless of the difference of subnets.

In the following descriptions, a MFP is configured to forward a search packet. However, the forwarding a search packet can be performed by an arbitrary information processing apparatus capable of always monitoring packets in a network (for example, a network device like a router or a server).

EXAMPLES

Figure 2:
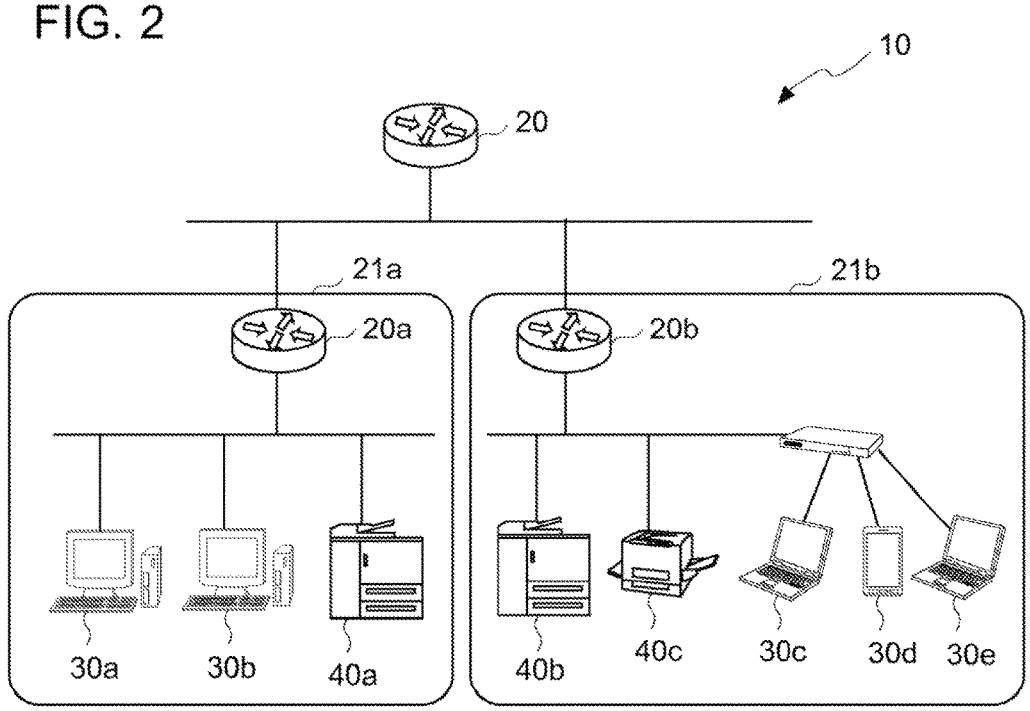
FIG. 2 is a schematic diagram illustrating an example of the constitution of a printing system according to one embodiment of the present invention.
Figure 3A:
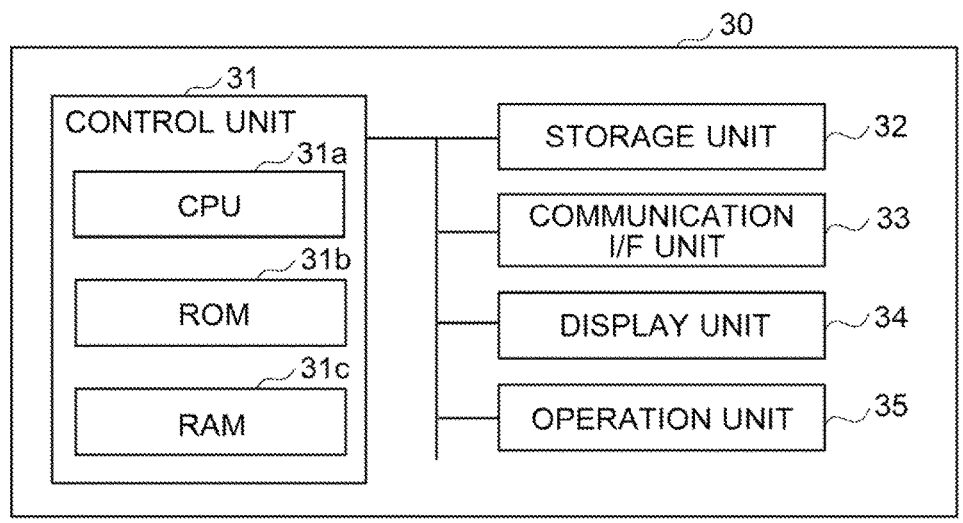
FIGS. 3A and 3B are block diagrams illustrating an example of the constitution of a client terminal according to one embodiment of the present invention.
Figure 3B:
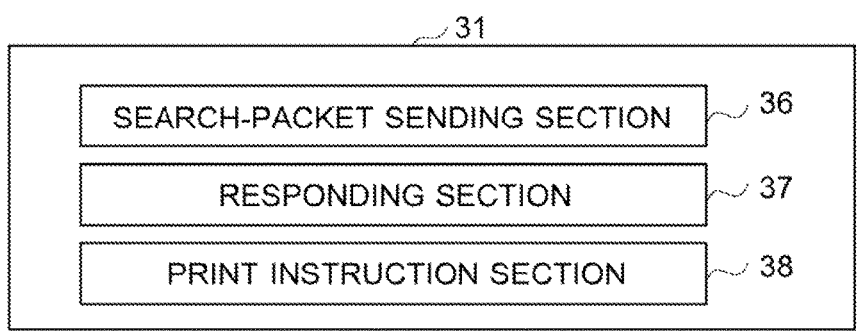
Figure 4A:
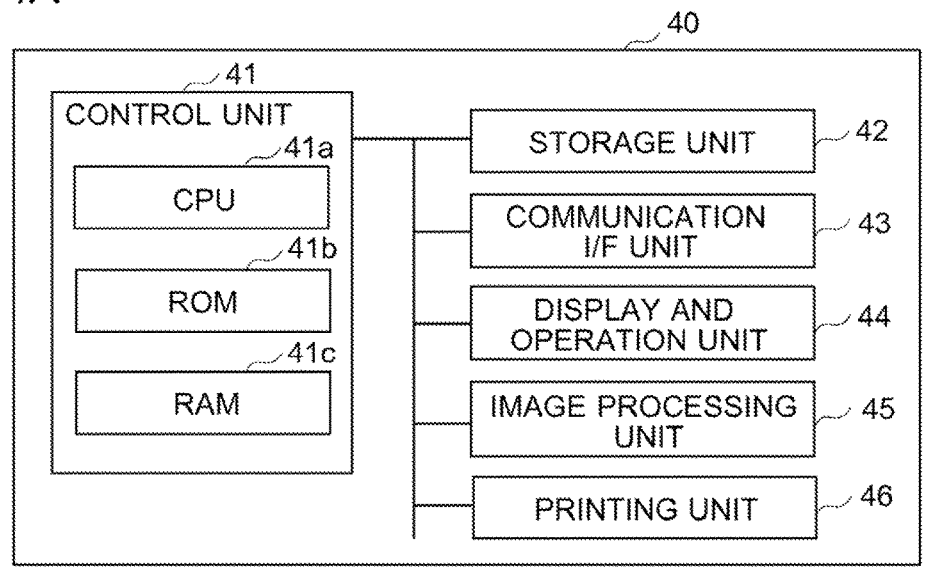
FIGS. 4A and 4B are block diagrams illustrating an example of the constitution of an image forming apparatus according to one embodiment of the present invention.
Figure 4B:
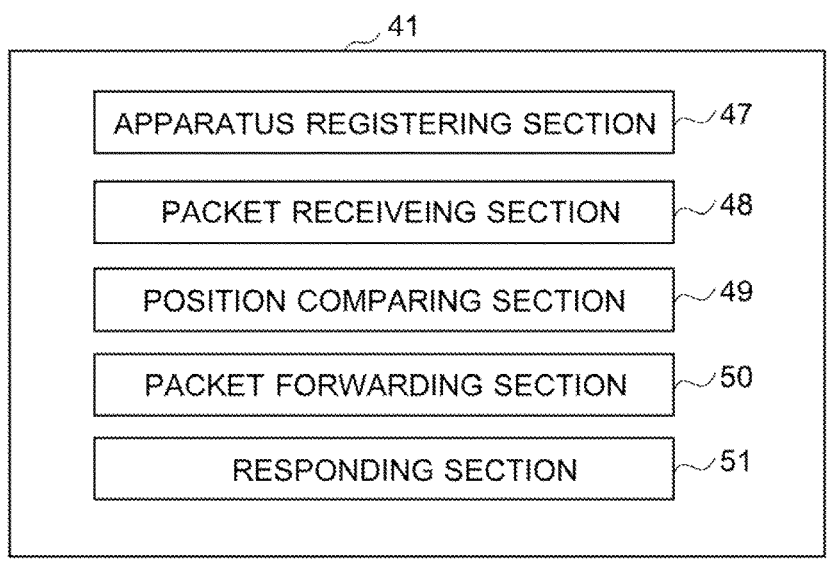
Figure 5:
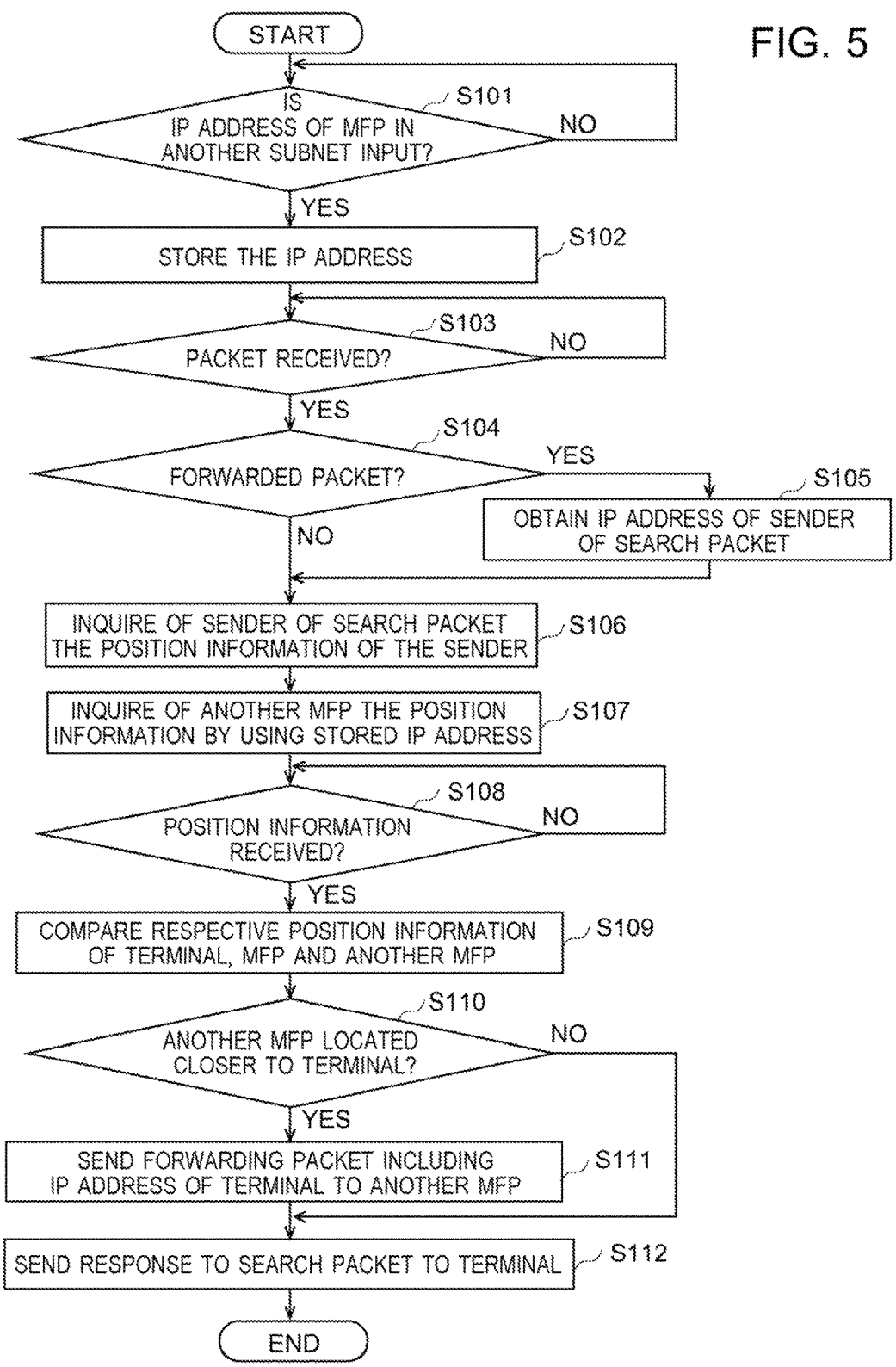
FIG. 5 is a flowchart illustrating an example of operations of the image forming apparatus according to one embodiment of the present invention.
Figure 12:
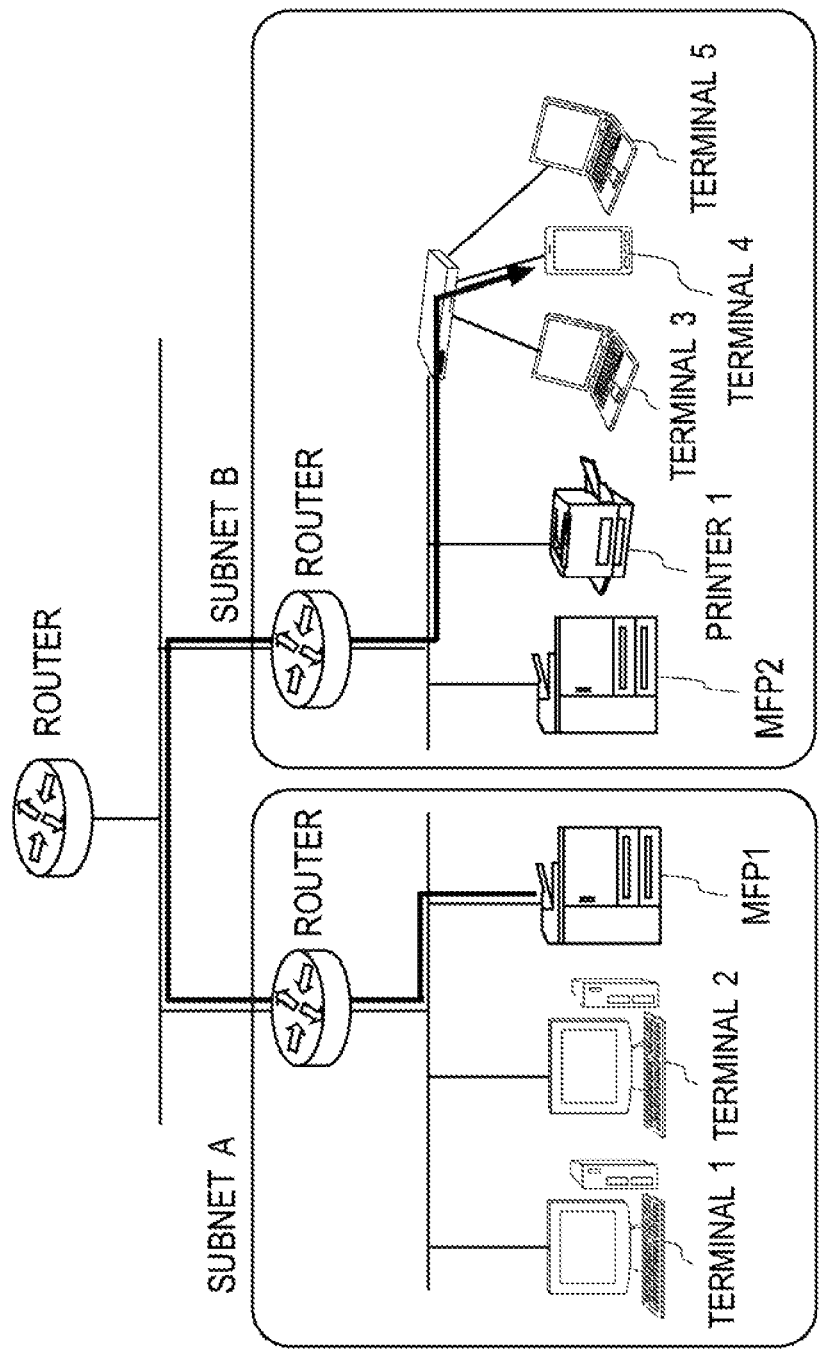
FIG. 12 is a schematic diagram for describing an apparatus searching method for use in a printing system according to one embodiment of the present invention.
Figure 13A:
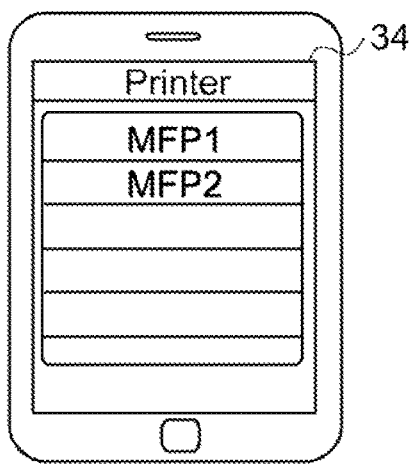
FIGS. 13A and 13B are diagrams illustrating an example of a screen showing a list of image forming apparatuses displayed on a client terminal according to one embodiment of the present invention.
Figure 13B:
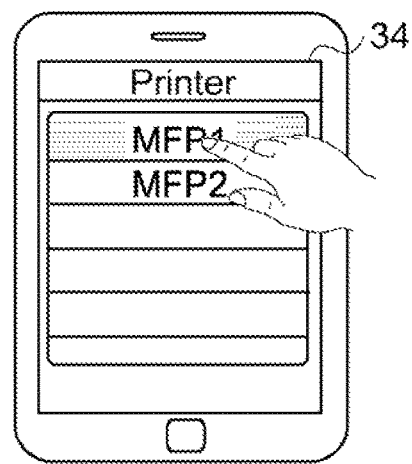
Figure 22A:
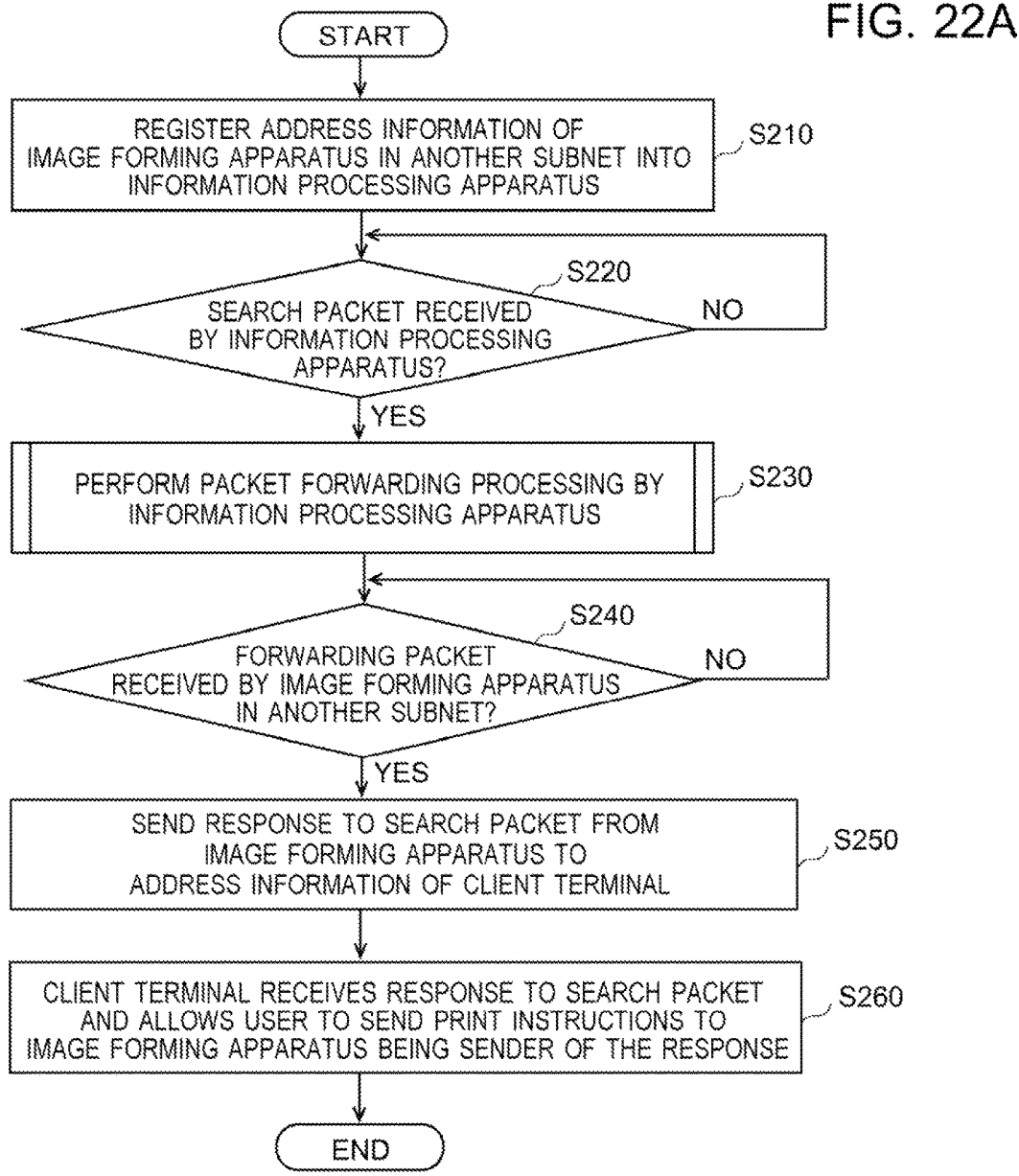
FIGS. 22A and 22B are flowcharts illustrating an example of an apparatus searching method for use in a printing system according to one embodiment of the present invention.
Figure 22B:
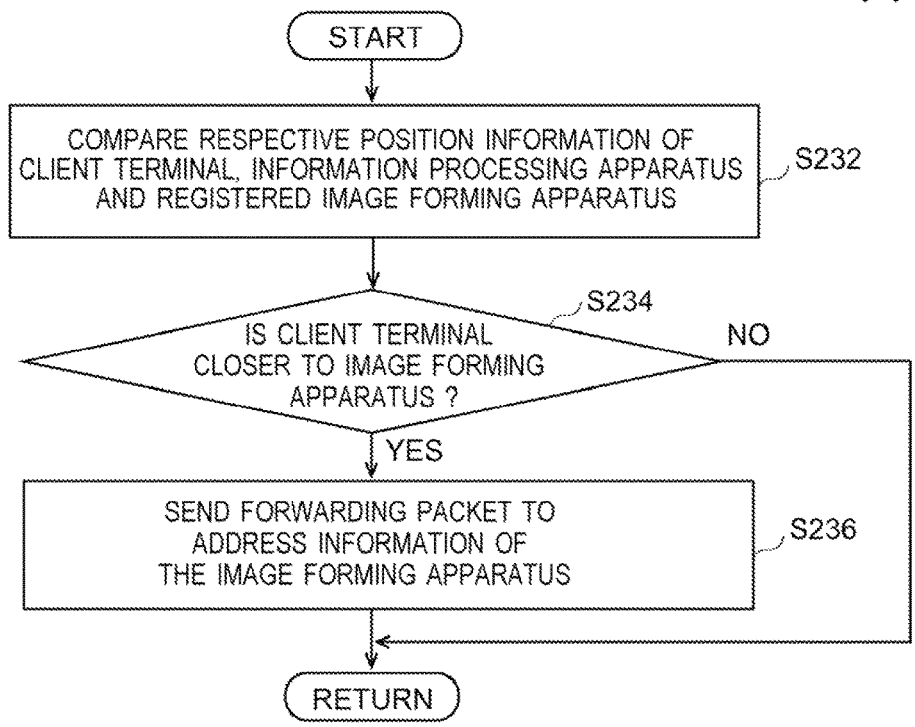

In order to describe an embodiment of the present invention in more in detail, a description is given to a printing system, an apparatus searching method, and an apparatus searching program according to one example of the present invention, with reference to FIGS. 2 to 17, FIGS. 22A and 22B and FIG. 23. FIG. 2 is a schematic diagram illustrating a constitution example of a printing system of the present example. FIGS. 3A and 3B are block diagrams illustrating a constitution example of the of a client terminal of the present example. FIGS. 4A and 4B are block diagrams illustrating a constitution example of an image forming apparatus of the present example. FIG. 5 is a flowchart illustrating an example of operations of the image forming apparatus of the present example. FIGS. 6 to 9, FIG. 11, FIG. 12 and FIGS. 14 to 16 each is a schematic diagram thy describing an apparatus searching method for use in the printing system of the present example. FIG. 10 and FIG. 17 each shows an example of a table of position information to be used for apparatus searching processing in the present example. FIGS. 13A and 13B are diagrams illustrating an example of a screen showing a list of image forming apparatuses displayed on a client terminal of the present example. FIGS. 22A and 22B are flowcharts illustrating an example of an apparatus searching method for use in a printing system of the present example. FIG. 23 is a flowchart illustrating another example of an apparatus searching method for use in a printing system of the present example.

In printing system 10 of the present example, a network includes a plurality of subnetworks 21, and each subnet includes router 20, client terminal 30 and image forming apparatus 40, where the network conforms to a standard, for example, Ethernet, Token Ring, or FDDI (Fiber-Distributed Data Interface). In the example of FIG. 2, the network includes subnet A (21a in FIG. 2) and subnet B (21b in FIG. 2) as the plurality of subnetworks 21, where the subnet A includes router 20a, client terminals 30a, 30b and image forming apparatus 40a, and the subnet B includes router 20b, client terminals 30c, 30d, 30e and image forming apparatuses 40b, 40c. Hereinafter, a constitution of each of client terminal 30 and image forming apparatus 40 is described in detail.

Client Terminal:

Client terminals 30 is a computing device like a personal computer, a smart phone, a tablet terminal, a PDA (Personal Digital Assistants), or the like. The client terminal 30 includes, as illustrated in FIG. 3A, control unit 31, storage unit 32, communication interface (I/F) unit 33, display unit 34 and operation unit 35.

Control unit 31 includes CPU (Central Processing Unit) 31a and memories, such as ROM (Read Only Memory) 31b and RAM (Random Access Memory) 31c. CPU 31a reads control programs stored in ROM 31b or storage unit 32 to load the control programs onto RAM 31c, and then executes the control programs, thereby controlling the overall operations client terminal 30.

Control unit 31, as illustrated in FIG. 3B, also works as search-packet sending section 36, responding section 37 and print instruction section 38.

Search-packet sending section 36 is configured to send a search packet, which is a packet for searching for image forming apparatus 40, to each apparatus located in a subnet by using multicast DNS.

Responding section 37 is configured to send position information of the client terminal 30 itself to image forming apparatus 40 in response to receiving an inquiry about position information from the image forming apparatus 40. The position information of the client terminal 30 itself may be stored in storage unit 32 by being input by an operator beforehand. Alternatively, in the case where the client terminal 30 includes a position detector, such as a GPS (Global Positioning System), position information detected by the position detector may be stored in storage unit 32.

Print instruction section 38 is configured to receive a response to a search packet, and cause display unit 34 to display one or more image forming apparatuses 40 which have responded to the search packet, in a screen showing a list of image forming apparatuses to which a user can send print instructions. Print instruction section 38 is further configured to send a print job to one of the image forming apparatuses 40 selected by a user through operation unit 35, to instruct the selected image forming apparatus 40 to print the print job.

Storage unit 32 includes a HDD (Hard Disk Drive) and/or SSD (Solid State Drive). The storage unit 32 stores various types of programs and various types of data (including position information of the client terminal 30 itself).

Communication interface unit 33 includes a NIC (Network Interface Card) and/or a modem. Communication interface unit 33 is configured to perform various operations including: sending a search packet, receiving a search packet and a response to a search packet, which will be described later, receiving an inquiry about position information, sending a response to an inquiry about position information, sending a print job, and other operations.

Display unit 34 includes a display, for example, a LCD (Liquid Crystal Display) or an organic EL (Electro-Luminescence) display, so as to display various kinds of screens such as a search screen to be used for searching image forming apparatus 40 and a screen showing a list of image forming apparatuses 40 searched.

Operation unit 35 includes hardware devices, such as hardware keys and touch sensors formed on display unit 34. Operation unit 35 is configured to receive user's operations on a screen displayed on display unit 34 so as to allow a user to give various instructions including: instruction to search for image forming apparatus 40, selecting image forming apparatus 40, and print instruction to image forming apparatus 40 selected.

Image Forming Apparatus:

Image forming apparatuses 40 is a printer, a MFP, or the like. As illustrated in FIG. 4A, image forming apparatus 40 includes control unit 41, storage unit 42, communication interface (I/F) unit 43, display and operation unit 44, image processing unit 45 and printing unit 46.

Control unit 41 includes CPU 41a and memories including ROM 41b and RAM 41c. CPU 41 reads control programs stored in ROM 41b or storage unit 42, loads the control programs onto RAM 41c, and executes the control programs, thereby performing the whole operations of the image forming apparatus 40.

Control unit 41, as illustrated in FIG. 4B, also works as apparatus registering section 47, packet receiving section 48, position comparing section 49, packet forwarding section 50 and responding section 51.

Apparatus registering section 47 is configured to obtain address information, which is referred to as an IP (Internet Protocol) address hereafter, of image forming apparatus 40 located in another subnet different from the subnet where the image forming apparatus 40 exists), and store the information in storage unit 42 so as to register the IP address of the image forming apparatus in another subnet. As mentioned above, the method of registering an IP address includes four methods. In the case of registering manually by an operator, apparatus registering section 47 uses display and operation unit 44 to display a registration screen for registering the image forming apparatus 40 in another subnet. On receiving an input of the IP address on the registration screen, apparatus registering section 47 stores, in storage unit 42, the input IP address and the corresponding image forming apparatus 40 with being associated with each other, thereby registering the IP address of the image forming apparatus 40.

Packet receiving section 48 is configured to monitor packets in the subnet, and, in response to receiving a packet, determines whether the received packet is a search packet (a packet for searching for an image forming apparatus in the printing system 10 in a multicast manner) sent from client terminal 30, or a forwarding packet sent from another apparatus (an information processing apparatus such as an image forming apparatus) which is configured to monitor packets in the network. When determining that the received packet is a forwarding packet, packet receiving section 48 obtains the IP address of client terminal 30 being the sender of a search packet, from the forwarding packet.

Position comparing section 49 is configured to perform the following operations. Position comparing section 49 inquires of client terminal 30 being the sender of the search packet and the image forming apparatus 40 in another subnet (the registered image forming apparatus 40), about position information, and obtains the respective position information of the apparatuses. Position comparing section 49 further obtains the position information of the image forming apparatus 40 itself from storage unit 42, and compares the position information of client terminal 30, the position information of image forming apparatus 40 itself and the position information of the image forming apparatus 40 in another subnet. Then, position comparing section 49 judges whether the client terminal 40 being the sender of the search packet is closer to the image forming apparatus 40 in another subnet than to the image forming apparatus 40 itself. If the position information of the client terminal 30 and/or the image forming apparatus 40 in another subnet has already been known, the position information may be stored beforehand in storage unit 42 so as to be used by position comparing section 49.

Packet forwarding section 50 is configured to perform the following operations. Packet forwarding section 50 obtains, from a search packet, the address information (IP address) of the client terminal 30 being the sender of the search packet, and creates a forwarding packet including information that the search packet has been sent and the address information (IP address) of the client terminal 30. Packet forwarding section 50 then designates the address information of the image forming apparatus 40 in another subnet (the registered image forming apparatus 40) as the destination of the forwarding packet and sends the created forwarding packet to the registered image forming apparatus 40. It is preferable that packet forwarding section 50 send the forwarding packet to the address information of the image forming apparatus 40 in another subnet (the registered image forming apparatus 40), in response to judging that the client terminal 30 is closer to the image forming apparatus 40 in another subnet than to the image forming apparatus 40 itself.

Responding section 51 is configured to perform the following operations. When packet receiving section 48 has received a search packet (that is, a search packet sent from client terminal 30 in the subnet where the image forming apparatus 40 exists), responding section 51 sends a response to the search packet to the client terminal 30 being the sender of the search packet so that the image forming apparatus 40 can receive print instructions from the client terminal 30. On the other hand, when packet receiving section 48 has received a forwarding packet (that is, a packet forwarded by an information processing apparatus or an image forming apparatus in another subnet), responding section 51 extracts, from the forwarding packet, the information that a search packet has been sent and the address information (IP address) of client terminal 30 being the sender of the search packet, and designates the address information of the client terminal 30 as the destination of a response to the search packet and sends the response to the search packet to the client terminal 30 so that the image forming apparatus 40 can receive print instructions from the client terminal 30. When packet receiving section 48 has received as forwarding packet including the same information a plurality of times, responding section 51 ignores the second and subsequent forwarding packets and omits responding to the search packet in response to receiving the forwarding packet the second or subsequent time.

Responding section 51 is further configured to send position information of the image forming apparatus 40 itself, in response to an inquiry about position information sent from client terminal 30 or another image forming apparatus 40. The position information of the image forming apparatus itself may be stored beforehand in storage unit 42 by being input by an operator. Alternatively, in the case where the image forming apparatus 40 includes a position detector, such as a GPS, the position information detected by the position detector may be stored in storage unit 42 so as to be used by responding section 51.

The apparatus registering section 47, packet receiving section 48, position comparing section 49, packet forwarding section 50 and responding section 51 may be constituted as hardware devices. Alternatively, the apparatus registering section 47, packet receiving section 48, position comparing section 49, packet forwarding section 50 and responding section 51 may be provided by a computer-readable program for searching for an apparatus in a printing system (an apparatus searching program) which is stored in a non-transitory recording medium like ROM 41*b* or storage unit 42 and includes instructions which cause the control unit 41 to function as these sections when being executed by CPU 41*a*. That is, the control unit 41 may be configured to serve as the apparatus registering section 47, packet receiving section 48, position comparing section 49, packet forwarding section 50 and responding section 51, when CPU 41*a* executes the apparatus searching program.

Storage unit 42 includes a HDD and/or a SSD. The storage unit 42 stores various types of programs and various types of data, where examples of the data include position information of the image forming apparatus 40 itself, a search packet, a forwarding packet, an IP address of image forming apparatus 40 located in another subnet.

Communication interface unit 43 includes a NIC and/or a modem. Communication interface unit 43 is configured to perform: receiving a search packet and a forwarding packet, sending a forwarding packet, sending a response to a search packet and a response to a forwarding packet, receiving an inquiry about position information, sending a response to an inquiry about position information, receiving a print job and other operations.

Display and operation unit 44 is a device, such as a touch panel, which includes a display unit and a pressure-sensitive operation unit (touch sensor) including transparent electrodes arranged in a lattice shape on the display unit. The display and operation unit 44 is configured to display various screens relating to image-forming processing so as to allow a user to perform various operations relating to image-forming processing.

Image processing unit 45 works as a raster-image processor and is configured to perform the following operations. Image processing unit 45 converts or rasterizes a print job into bitmap image data. Image processing unit 45 performs screening, tone correction, density-balance adjustment, thinning, halftone-dot processing and other processing on the bitmap image data, if they are needed. Image processing unit 45 then outputs the created bitmap image data to printing unit 46.

Printing unit 46 (print engine) is configured to perform printing by using bitmap image data. In concrete terms, printing unit 46 includes an exposure unit, an image forming unit, an intermediate transfer belt, a second transfer roller, a fixing unit, and a conveyance unit. The exposure unit is configured to irradiate a photoreceptor drum with a laser beam according to bitmap image data so as to perform an exposure process. The image forming unit includes the photoreceptor drum, a developing section, a charging section, a photoreceptor cleaning section, and a first transfer roller, and is configured to form on the photoreceptor drum a toner image in each of CMYK colors. The intermediate transfer belt is driven by rollers so as to work as an intermediate transfer body which conveys the toner images formed by the image forming unit onto a print medium. The second transfer roller is configured to transfer the toner images on the intermediate transfer belt onto a print medium. The fixing unit is configured to fix the images transferred on the print medium. The conveyance unit includes components for conveying print media, for example, a feed roller, a registration roller, a loop roller, a reverse roller, and an output roller.

It should be noted that FIG. 2 to FIG. 4B illustrate printing system 10 of the present example for illustrative purpose only, and the number of subnets in the network for the printing system 10 and the constitution and control of each of client terminals 30 and image forming apparatuses 40 located in the subnets may be modified appropriately.

For example, printing system 10 illustrated in FIG. 2 employs the constitution such that client terminals 30 and image forming apparatuses 40 are located in each subnet. However, an apparatus that receives a search packet and then sends a forwarding packet is not limited to image forming apparatus 40, and an arbitrary information processing apparatus (for example, a network apparatus like router 20 or a server) located in the subnet where client terminal 30 that sends a search packet is located, may be employed as the apparatus that receives a search packet and then sends a forwarding packet. In printing system 10 including an information processing apparatus that receives a search packet and sends a forwarding packet, the control unit or hardware processor of the information processing apparatus may be configured to work as the apparatus registering section, packet receiving section and packet forwarding section (if needed, the position comparing section) when a hardware processor like a CPU of the information processing apparatus executes a computer-readable program for searching for an apparatus in a printing system (an apparatus searching program) which is stored in a non-transitory recording medium like a storage unit. In the printing system 10, control unit 41 of image forming apparatus 40 that receives a forwarding packet, may be configured to work as packet receiving section 48 and responding section 51 when CPU 41a executes a computer-readable program for searching for an apparatus in a printing system (an apparatus searching program) which is stored in a non-transitory recording medium like ROM 41b or storage unit 42. Further, the printing system 10 may further include image forming apparatus 40 that receives a forwarding packet and then further forwards the forwarding packet. Control unit 41 of the image forming apparatus 40 may be configured to work as apparatus registering section 47, packet receiving section 48, packet forwarding section 50 (if needed, the position comparing section 49) when CPU 41a executes a computer-readable program for searching for an apparatus in a printing system (an apparatus searching program) which is stored in a non-transitory recording medium like ROM 41b or storage unit 42.

A description is given of an example of an apparatus searching method for use in the above-described printing system 10, with reference to the flowcharts of FIGS. 22A and 22B. In the printing system 10, client terminal 30 located in a subnet in a network is configured to send a search packet, and an information processing apparatus located in the same subnet is configured to send a forwarding packet to another image forming apparatus 40 located in another subnet in the network.

The information processing apparatus includes a control unit or a hardware processor like a CPU configured to perform the following operations when executing an apparatus searching program stored in a non-transitory recording medium like a storage unit.

First, as illustrated in FIG. 22A, the hardware processor (apparatus registering section) of the information processing apparatus registers address information of the image forming, apparatus 40 located in another subnet (S210). When the hardware processor (packet receiving section) of the information processing apparatus has received, from the client terminal 30 located in the same subnet, a search packet being a packet for searching for an image forming apparatus in the priming system 10 in a multicast manner (YES in S220), the hardware processor (packet forwarding section) of the information processing apparatus performs packet forwarding processing (S230). In the packet forwarding processing, the hardware processor (packet forwarding section) obtains, from the search packet received, address information of the client terminal 30 being the sender of the search packet, creates a forwarding packet including information that the search packet has been sent and the address information of the client terminal 30, and sends the forwarding packet to the address information (IP address) of the image forming apparatus 40 registered in S210. In the packet forwarding processing, as illustrated in FIG. 22B, the hardware processor (position comparing section) of the information processing apparatus may further perform position comparing processing (S232). In the processing, the hardware processor (position comparing section) obtains, from the client terminal 30 and the image forming apparatus 40 registered in S210, respective position information, and obtains, front the storage unit of the information processing apparatus, the position information of the information processing apparatus itself, to compare the position information of the client terminal 30, the position information of the information processing apparatus and the position information of the registered image forming apparatus 40. When judging that the client terminal 30 is closer to the image forming apparatus 40 than to the information processing apparatus (YES in S234), the hardware processor (packet forwarding section) may send the forwarding packet to the address information of the image forming apparatus 40 registered in S210 (S236).

The image forming apparatus 40 located in another subnet includes a control unit or a hardware processor like a CPU configured to perform the following operations when executing an apparatus searching program stored in a non-transitory recording medium like ROM 41b or storage unit 42.

When the hardware processor (packet receiving section 48) of the image forming apparatus 40 in another subnet has received the forwarding packet from the information processing apparatus (YES in S240), the hardware processor (responding section 51) of the image forming apparatus 40 in another subnet performs the responding processing (S250). In the responding processing, the hardware processor (responding section 51) extracts the in that the search packet has been sent and the address information of the client terminal 30 from the forwarding packet, and sends a response to the search packet to the address information of the client terminal 30. When the hardware processor (print instruction section 35) of the client terminal 30 has received the response to the search packet from the image forming apparatus 40 in another subnet, the hardware processor (print instruction section 38) presents a user the image forming apparatus 40 being the sender of the response so as to allow a user to send print instructions to the image forming apparatus 40 (S260). For example, the hardware processor (print instruction section 38) may use display unit 34 to indicate image forming apparatuses 40 which have responded to the search packet in a screen showing a list of image forming apparatuses to which a user can send print instructions, and receive user's print instructions.

Next, a description is given of another ex ample of an apparatus searching method for use in the above-described printing system 10 with reference to the flowcharts of FIG. 23. The printing system 10 further includes another image forming apparatus 40 located in a subnet (third subnet), which is different from the subnet (first subnet) where the above information processing apparatus and the above client terminal 30 are located and another subnet (second subnet) where the above image forming apparatus 40 is located. The image forming apparatus 40 located in the third subnet is configured to further forward a forwarding packet.

In this example, the information processing apparatus includes a hardware processor like a CPU configured to perform the following operations when executing an apparatus searching program stored in a non-transitory recording medium like a storage unit.

Similarly to the flowchart shown in FIG. 22A, the hardware processor (apparatus registering section) of the information processing apparatus registers address information of the image forming apparatus 40 located in the second subnet (S310). When the hardware processor (packet receiving section) of the information processing apparatus has received, from the client terminal 30 located in the same subnet (the first subnet) where the information processing apparatus is located, a search packet for searching for an image forming apparatus in the printing system 10 in a multicast manner (YES in S320), the hardware processor (packet forwarding section) of the information processing apparatus performs packet forwarding processing (S330). In the packet forwarding processing, the hardware processor (packet forwarding section) uses the received search packet to create a forwarding packet including information that the search packet has been sent and the address information of the client terminal 30 being the sender of the search packet, and sends the forwarding packet to the address information (IP address) of the registered image forming apparatus 40 in the second subnet, in the packet forwarding processing, similarly to the flowchart of FIG. 22B, the hardware processor (position comparing section) of the information processing apparatus may further perform the position comparing processing. When judging that the client terminal 30 is closer to the image forming apparatus 40 than to the information processing apparatus, the hardware processor (packet forwarding section) may send the forwarding packet to the address information of the registered image forming apparatus 40 in the second subnet.

The hardware processor of the image forming apparatus 40 in the second subnet performs the following operations in place of the responding processing (S250) shown in the flowchart of FIG. 22A. First, the hardware processor (apparatus registering section 47) of the image forming apparatus 40 in the second subnet registers the address information of the image forming apparatus 40 in the third subnet in advance (S340). When the hardware processor (packet receiving section 48) of the image forming apparatus 40 in the second subnet has received the forwarding packet from the information processing apparatus (YES in S350), the hardware processor (packet forwarding section 50) of the image forming apparatus 40 in the second subnet forwards the forwarding packet to the address information of the image forming apparatus 40 in the third subnet registered in S340 (S360). In this process, similarly to the above, the hardware processor (position comparing section 49) of the image forming apparatus 40 in the second subnet may further perform the position comparing processing. When judging that the client terminal 30 is closer to the image forming apparatus 40 in the third subnet than to the image forming apparatus 40 in the second subnet, the hardware processor (packet forwarding section) of the image forming apparatus 40 in the second subnet may send the forwarding packet to the address information of the registered image forming apparatus 40 in the third subnet.

When the hardware processor (packet receiving section 48) of the image forming apparatus 40 in the third subnet has received the forwarding packet from the image forming apparatus 40 in the second subnet (YES in S370), the hardware processor (responding section 51) of the image forming apparatus 40 in the third subnet performs the responding processing (S380). In the responding processing, the hardware processor (responding section 51) extracts the information that the search packet has been sent and the address information of the client terminal 30 from the forwarding packet, and sends a response to the search packet to the address information of the client terminal 30. When the hardware processor (print instruction section 38) of the client terminal 30 has received the response to the search packet from the image forming apparatus 40 in the third subnet, the hardware processor (print instruction section 38) presents a user the image forming apparatus 40 being the sender of the response so as to allow a user to send print instructions to the image forming apparatus 40 (S390).

Hereinafter, a description is given to operations of printing system 10 of the present example, with reference to the flowchart of FIG. 5. CPU 41a reads the apparatus searching program stored in ROM 41b or storage unit 42, loads the program onto RAM 41c, and executes the program, thereby performing steps of the flowchart to FIG. 5. In the following description, it should be noted that client terminal 30 is abbreviated as a terminal and image forming apparatus 40 is abbreviated as a MFP. The following description is given on the basis of the printing system illustrated in FIGS. 1A to 1D wherein terminal 4 serves as client terminal 30 that send a search packet, MFP2 serves as image forming apparatus 40 that forwards a packet and MFP1 serves as image forming apparatus 40 that responds to the forwarded packet.

Figure 6:
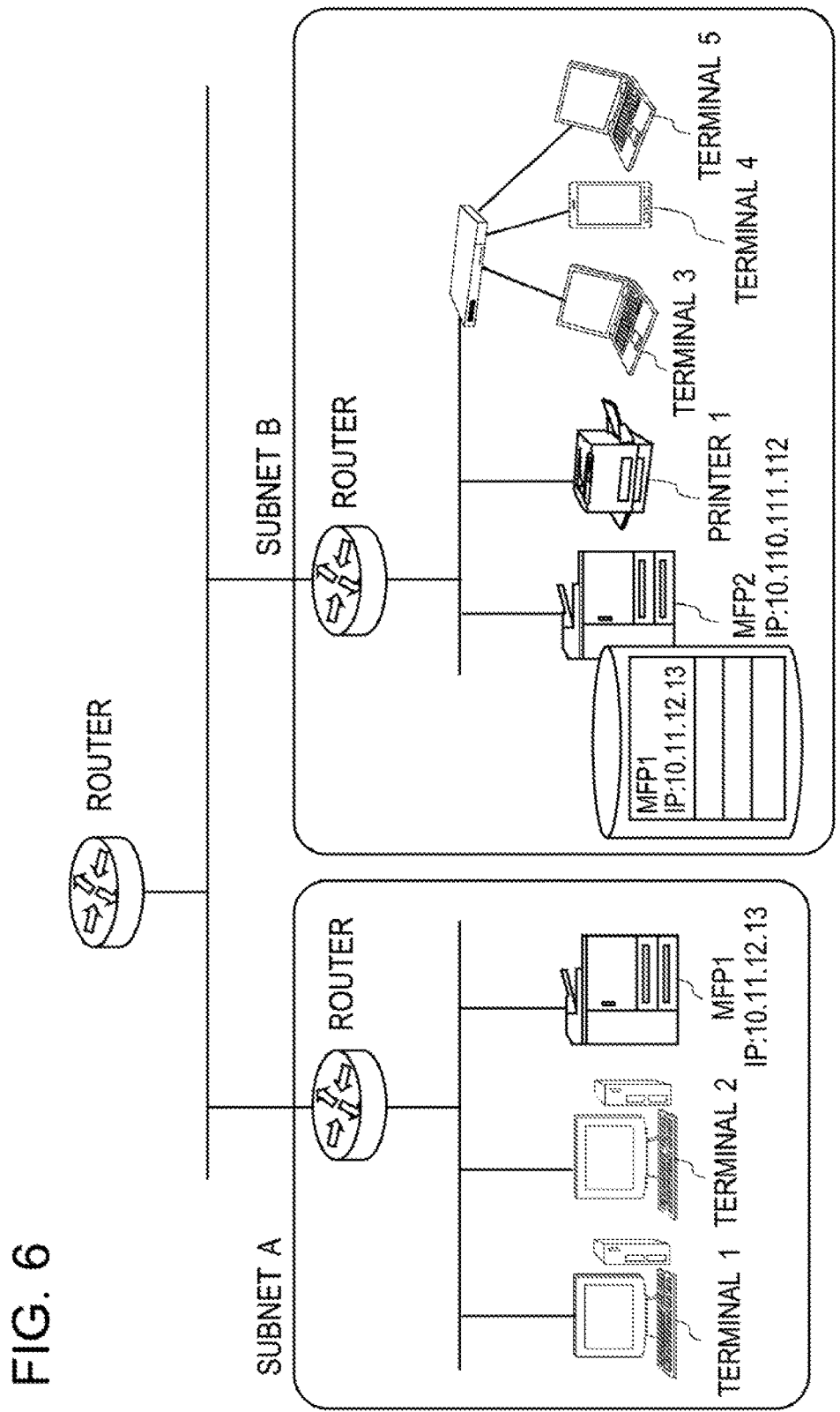
FIG. 6 is a schematic diagram for describing an apparatus searching method for use in a printing system according to one embodiment of the present invention.
Figure 7:
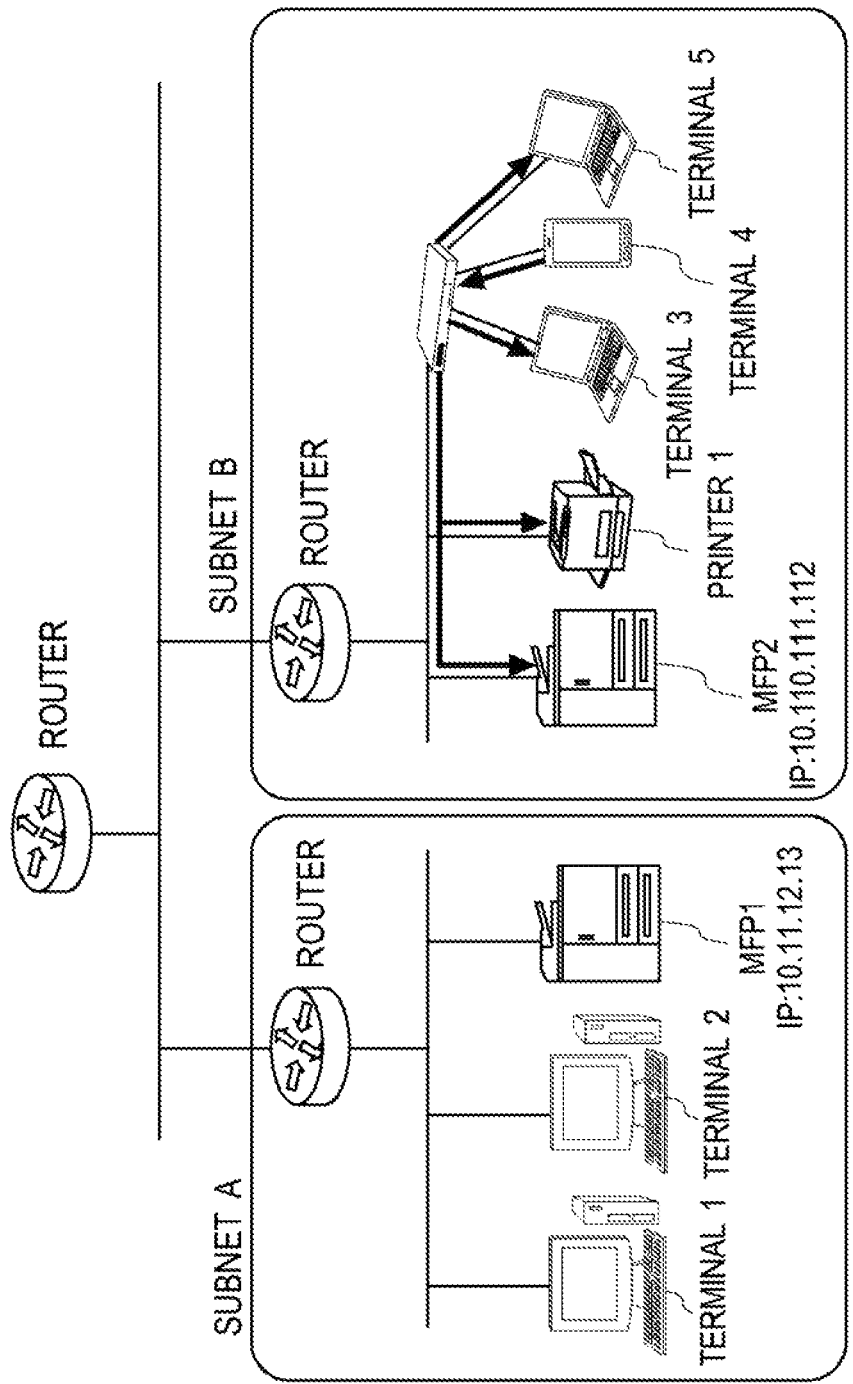
FIG. 7 is a schematic diagram for describing an apparatus searching method for use in a printing system according to one embodiment of the present invention.

Control unit 41 (apparatus registering section 47) of MFP2 uses display and operation unit 44 to display a registration screen for registering a MFP located in another subnet, and determines whether an IP address is input on the registration screen (S101). In response to receiving an input of IP address on the registration screen, the control unit 41 (apparatus registering section 47) stores, in storage unit 42, the IP address with being associated with the corresponding MFP (S102). For example, as illustrated in FIG. 6, when the IP address of MFP1 in subnet A is "10.11.12.13" and the IP address of MFP2 in subnet B is "10.110.111.112", control unit 41 (apparatus registering section 47) stores, in storage unit 42, the IP address of 10.11.12.13 with being associated with MFP1.

Next, a user connects terminals 4, such as a smart phone, to a subnet, to search for a MFP in the network. In concrete terms, as illustrate in FIG. 7, control unit 31 (search-packet sending section 36) of terminal 4 creates a search packet for searching for a MFP by using the multicast DNS, and sends the created search packet in a multicast manner. This search packet is sent to each apparatus (MFP2, printer 1, terminal 3 and terminal 5) in subnet B, as indicated with the thick arrows in FIG. 7.

Control unit 41 (packet receiving section 48) of MFP2 monitors packets in the subset (S103), and in response to receiving a packet (YES in S103), analyzes the contents of the received packet and determines whether the received packet is a forwarded packet (S104). In concrete terms, the control unit 41 determines whether the packet includes information that a search packet has been sent. When determining that the received packet is a forwarded packet (the received packet includes the information that a search packet has been sent), the control unit 41 obtains the IP address of terminal 4 being the sender of the search packet, from the forwarded packet (S105).

Figure 8:
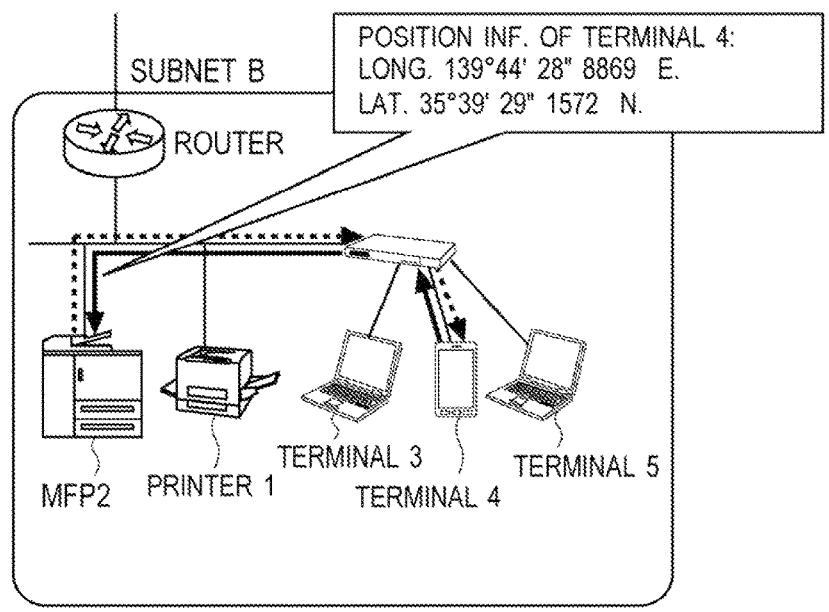
FIG. 8 is a schematic diagram for describing an apparatus searching method for use in a printing system according to one embodiment of the present invention.

Next, as illustrated in FIG. 8, control unit 41 (position comparing section 49) of MFP2 inquires of terminal 4 being the sender of the search packet, the position information, and obtains from terminal 4 the position information of the terminal 4 (S106). Herein, MFP2 obtains the position information of 139° 44' 28" 8869 east longitude and 35° 39' 29" 1572 north latitude, from terminal 4.

Figure 9:
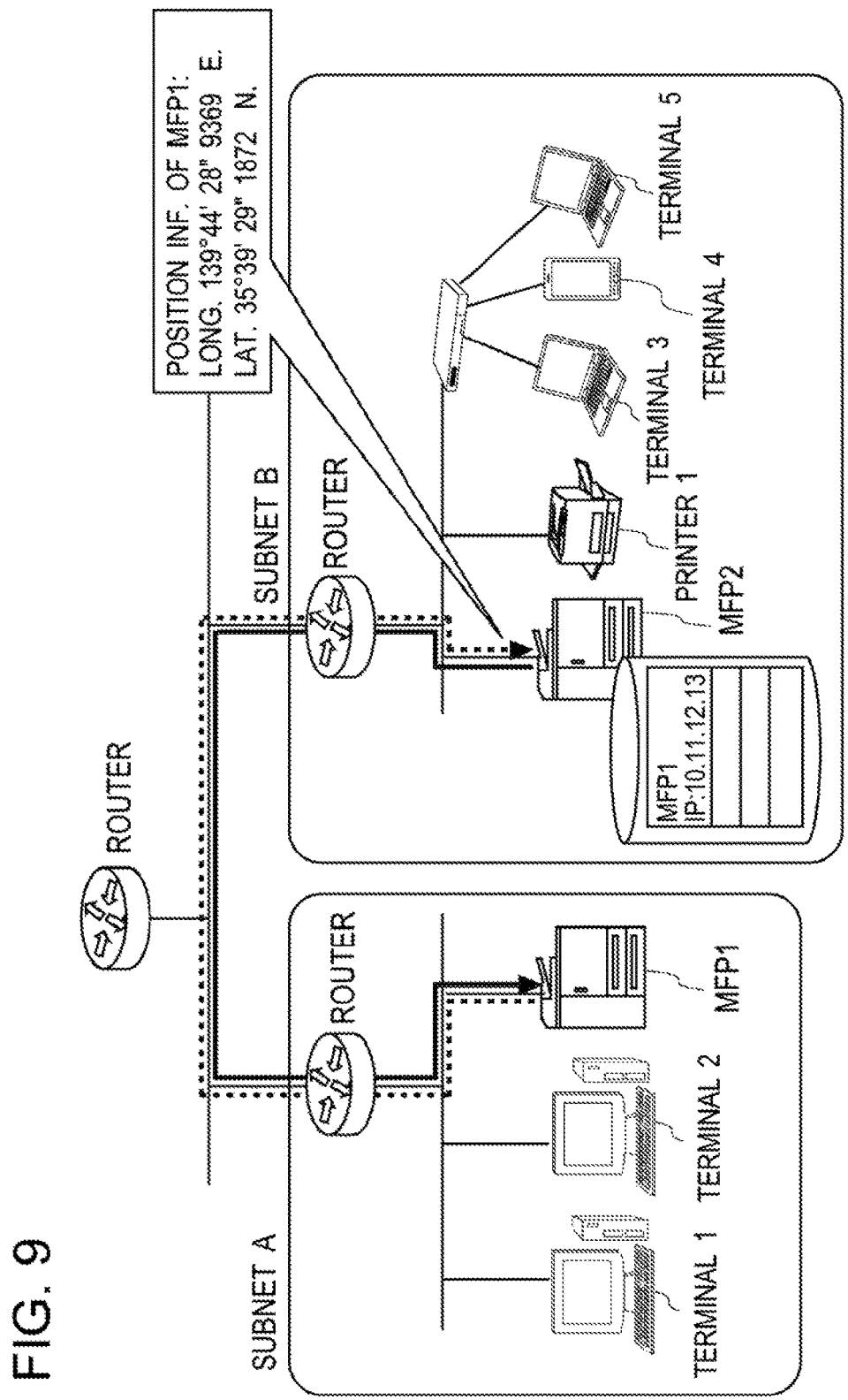
FIG. 9 is a schematic diagram for describing an apparatus searching method for use in a printing system according to one embodiment of the present invention.
Figure 11:
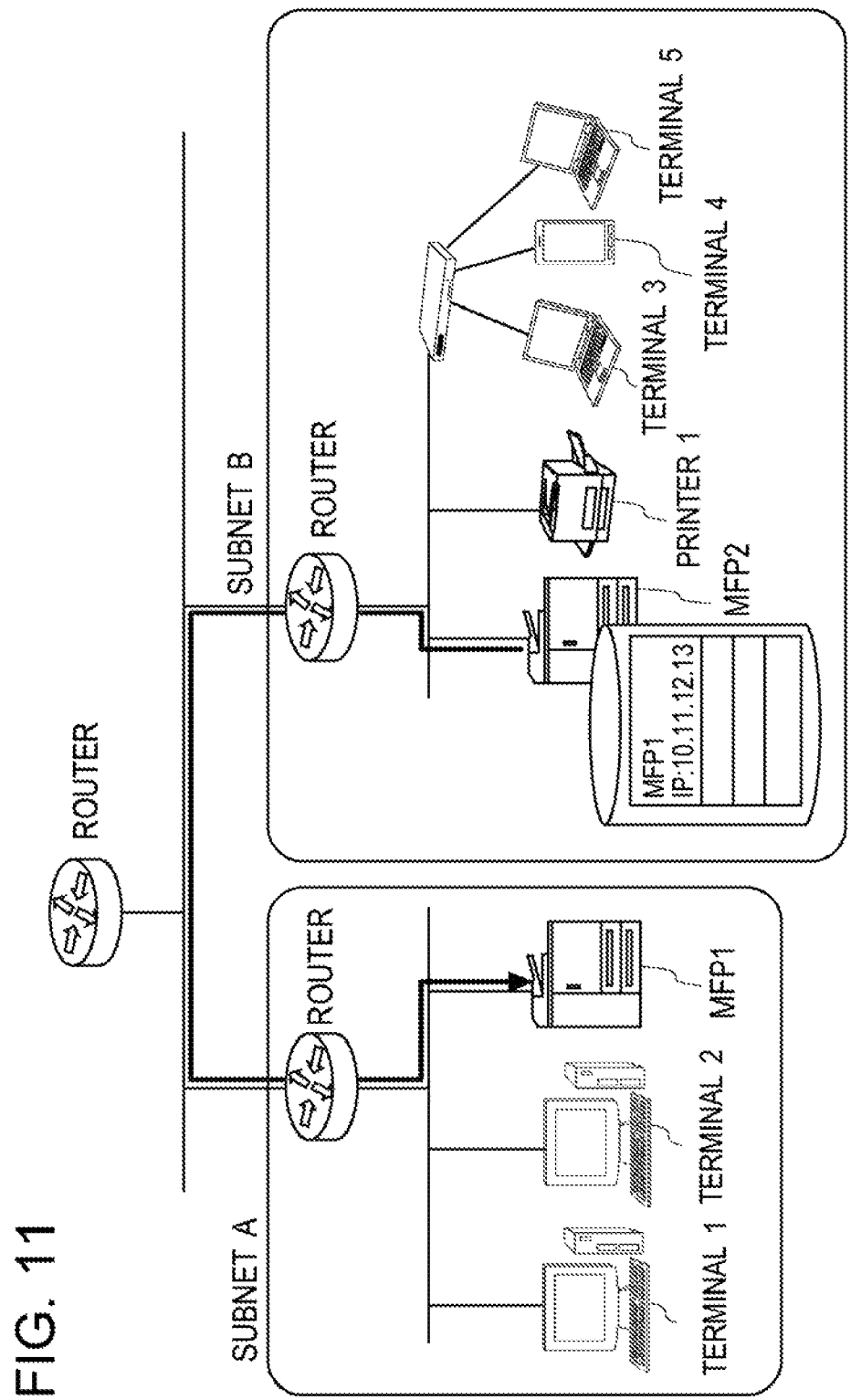
FIG. 11 is a schematic diagram for describing an apparatus searching method for use in a printing system according to one embodiment of the present invention.

Next, control unit 41 (position comparing section 49) of MFP2 inquires of MFP in another subnet (subnet A) the position information by using the IP address stored in S102, and obtains the position information from the MFP in another subnet (S107). In concrete terms, as illustrated in FIG. 9, MFP2 inquires of MFP1 the position information of by using the IP address stored in storage unit 42, and obtains the position information of 139° 44' 28" 9369 east longitude and 35° 39' 29" 1872 north latitude, from MFP1.

Then, control unit 41 (position comparing section 49) of MFP2 determines whether position information has been received from both terminal 4 being the sender of the search packet and MFP1 (S108). When determining that the position information has been received from the both apparatuses, control unit 41 (position comparing section 49) obtains the position information of itself (MFP2) from storage unit 42, and compares the position information of terminal 4, the position information of MFP2, and the position information of MFP1. In concrete terms, as illustrated in FIG. 10, control unit 41 (position comparing section 49) of MFP2 obtains the position information of terminal 4 being 139° 44' 2" 8869 east longitude and 35° 39' 29" 1572 north latitude; the position information of MFP1 being 139° 44' 28" 9369 east longitude and 35° 39' 29" 1872 north latitude; and the position information of the itself (MFP2) being 139° 44' 28" 9869 east longitude and 35° 39' 29" 2072 north latitude. Accordingly, a difference in the position information between terminal 4 and MFP1 becomes 0° 0' 0" 500 in longitude and 0° 0' 0" 300 in latitude; and a difference in the position information between terminal 4 and MFP2 becomes 0° 0' 0" 1000 in longitude and 0° 0' 0" 500 in latitude.

Next, control unit 41 (position comparing section 49) of MFP2 judges whether terminal 4 is closer to the MFP in another subnet (MFP1) registered than to MFP2 (S110). When judging that terminal 4 is closer to the MFP in another subnet (MFP1) than to MFP2 as in the example of FIG. 10 (YES in S110), control unit 41 (packet forwarding section 50) of MFP2 extracts, from the search packet, the IP address of terminal 4 being the sender of the search packet, creates a forwarding packet to inform the information that the search packet has been sent and the IP address of terminal 4 being the sender of the search packet (a forwarding packet including information that the search packet has been sent and the address information of terminal 4), and sends the created forwarding packet to MFP1 (S111). The extraction of the IP address of terminal 4 being the sender of the search packet may be executed in S104 or S106.

When receiving the forwarding packet, control unit 41 (responding section 51) of MFP1 analyzes the forwarding packet, and extracts, from the forwarding packet, the information that the search packet has been sent and the IP address of terminal 4 being the sender of the search packet. Control unit 41 (responding section 51), as illustrated in FIG. 12, then sends a response of its own to the search packet sent by terminal 4 with the extracted IP address being designated as a destination of the response (in other words, sends the response to the search packet to the extracted IP address) (S112).

Figure 14:
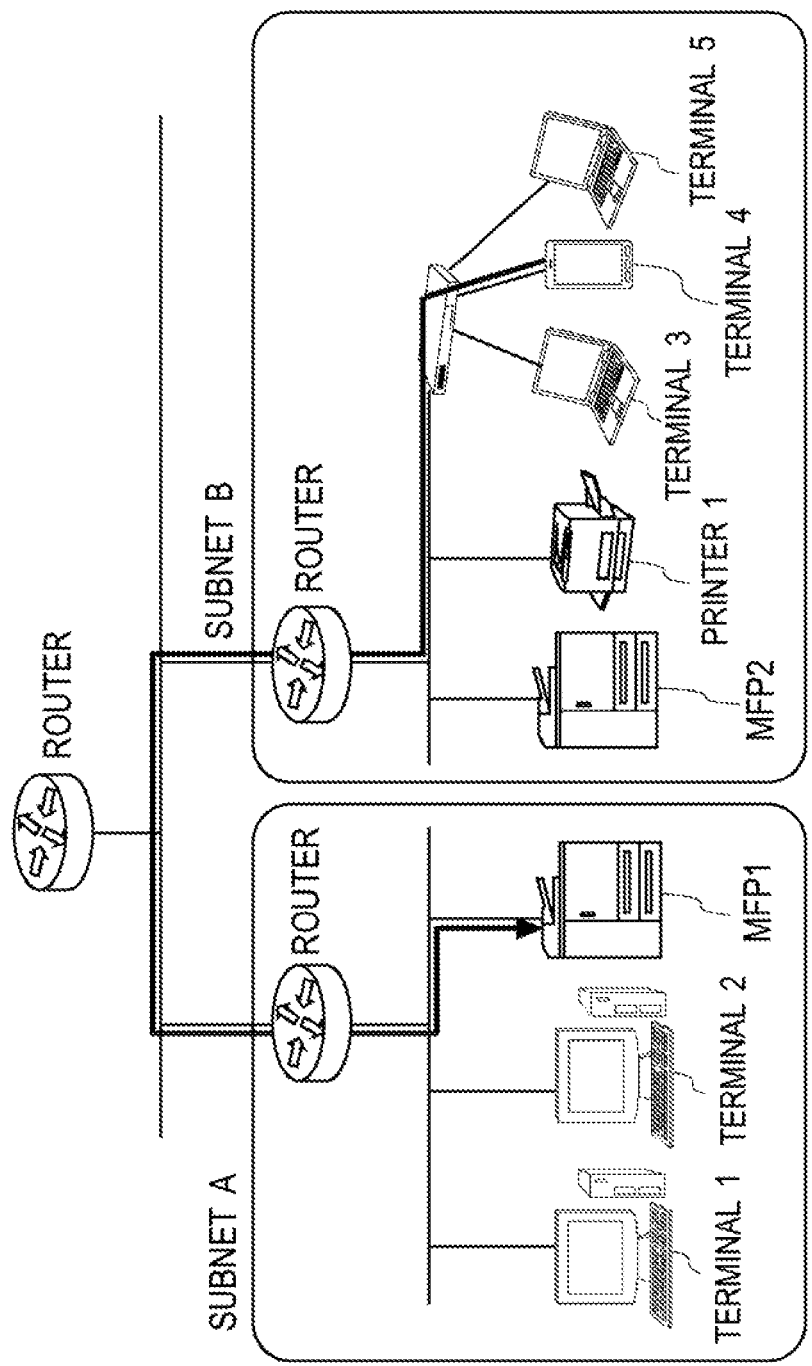
FIG. 14 is a schematic diagram for describing an apparatus searching method for use in a printing system according to one embodiment of the present invention.

After these operations, terminal 4 receives the response to the search packet from MFP1 and allows a user to send print instructions to MFP1. That is, as illustrated in FIG. 13A, terminal 4 uses display unit 34 to display a list screen showing search results, which include not only MFP2 in subnet B but also MFP1 in subnet A, as a screen showing a list of apparatuses to which a user can send print instructions. Successively, as illustrated in FIG. 13B, when a user selects MFP1 from the list screen, terminal 4 sends a print job to MFP1, as illustrated in FIG. 14, and MFP1 prints the print job received.

As described above, when receiving a search packet, which is a packet for searching for an image forming apparatus in the printing system, sent from client terminal 30 in a multicast matter, image forming apparatus 40 obtains from the search packet the IP address of client terminal 30 being the sender of the search packet. The image forming apparatus 40 then sends a forwarding packet to image forming apparatus 40 located in another subnet which has been registered in advance, where the forwarding packet includes information that the search packet has been sent and the IP address of client terminal 30 being the sender of the search packet. When receiving the forwarding packet, image forming apparatus 40 in another subnet extracts the information that the search packet has been sent and the IP address of client terminal 30 from the forwarding packet, and sends a response to the search packet directly (by designating the address information of the client terminal 30 as the destination of the response) to client terminal 30 being the sender of the search packet. Thereby, client terminal 30 that sends print instructions, even if it is a client terminal temporarily linked to a subnet, can easily find an image forming apparatus in a subnet which is different front the subnet where the client terminal 30 exists, with no need of giving an additional function to the client terminal 30 or modifying a function of the client terminal 30. It makes client terminal 30 possible to allow a user to send print instructions to image forming apparatus 40 located in the subnet which is different front the subnet where the client terminal 30 exists, in response to receiving a response or responses to the searching packet. Furthermore, the image forming apparatus 40 that received a search packet, may compare respective position information of the client terminal 30, the image framing apparatus 40 itself and the image forming apparatus 40 in another subnet, and send the forwarding packet to the image forming apparatus 40 in another subnet only when judging that the client terminal 30 is closer to the image forming apparatus 40 in another subnet than to the image forming apparatus 40 itself. It makes the client terminal 30 possible to allow a user to send print instructions to image forming apparatus 40 close to the client terminal 30, across the boundary of the subnet.

In the above-mentioned flow, MFP2 that received a search packet from terminal 4, sends a forwarding packet to MFP1. Additionally to the operations, MFP1 that received the forwarding packet may further forward the forwarding packet to MFP in the other subnet (the subnet different from subnet A and subnet B). In this case, the MFP1 performs the following operations in accordance with the flowchart of FIG. 5.

In concrete terms, in response to receiving an input of IP address (IP address of MFP3 in subnet C) on the registration screen for registering a MFP located in another subnet, control unit 41 (apparatus registering section 47) of MFP1 stores, in storage unit 42, the IP address with being associated with the corresponding MFP, similarly to the above (S101 and S102).

Next, in response to receiving a packet (YES S103), control unit 41 (packet receiving section 48) of determines whether the received packet is a forwarded packet (S104). In this example, since the received packet is a forwarded packet (that is, the received packet includes information that a search packet has been sent), control unit 41 (packet receiving section 48) of MFP1 obtains the IP address of terminal 4 being the sender of the search packet, from the forwarded packet (S105).

Figure 15:
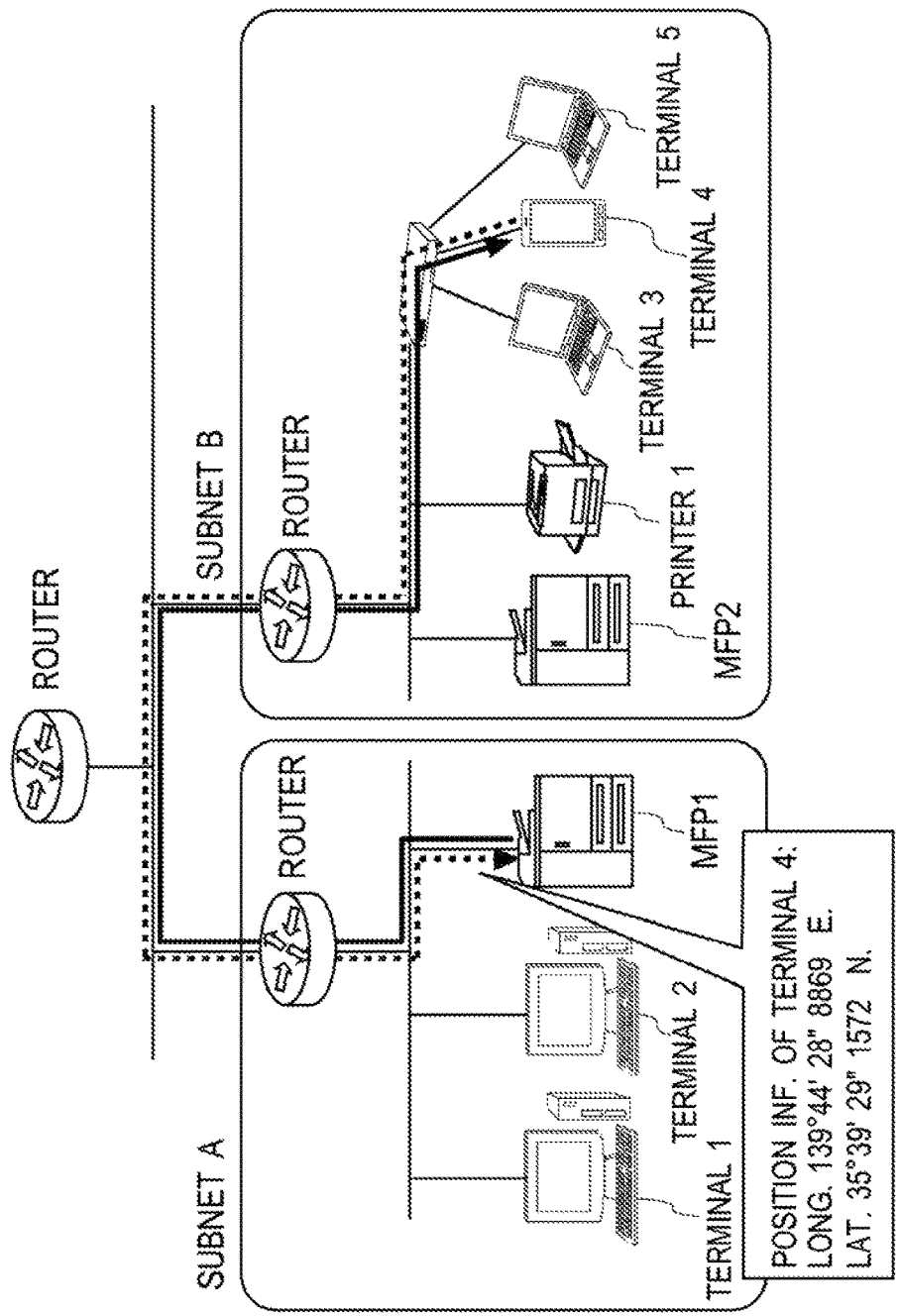
FIG. 15 is a schematic diagram for describing an apparatus searching method for use in a printing system according to one embodiment of the present invention.

Next, as illustrated in FIG. 15, control unit 41 (position comparing section 49) of MFP1 inquires of terminal 4 being the sender of the search packet the position information of terminal 4, and obtains the position information (139° 44' 28" 8869 east longitude and 35° 39' 29" 1572 north latitude) from terminal 4 (S106).

Figure 16:
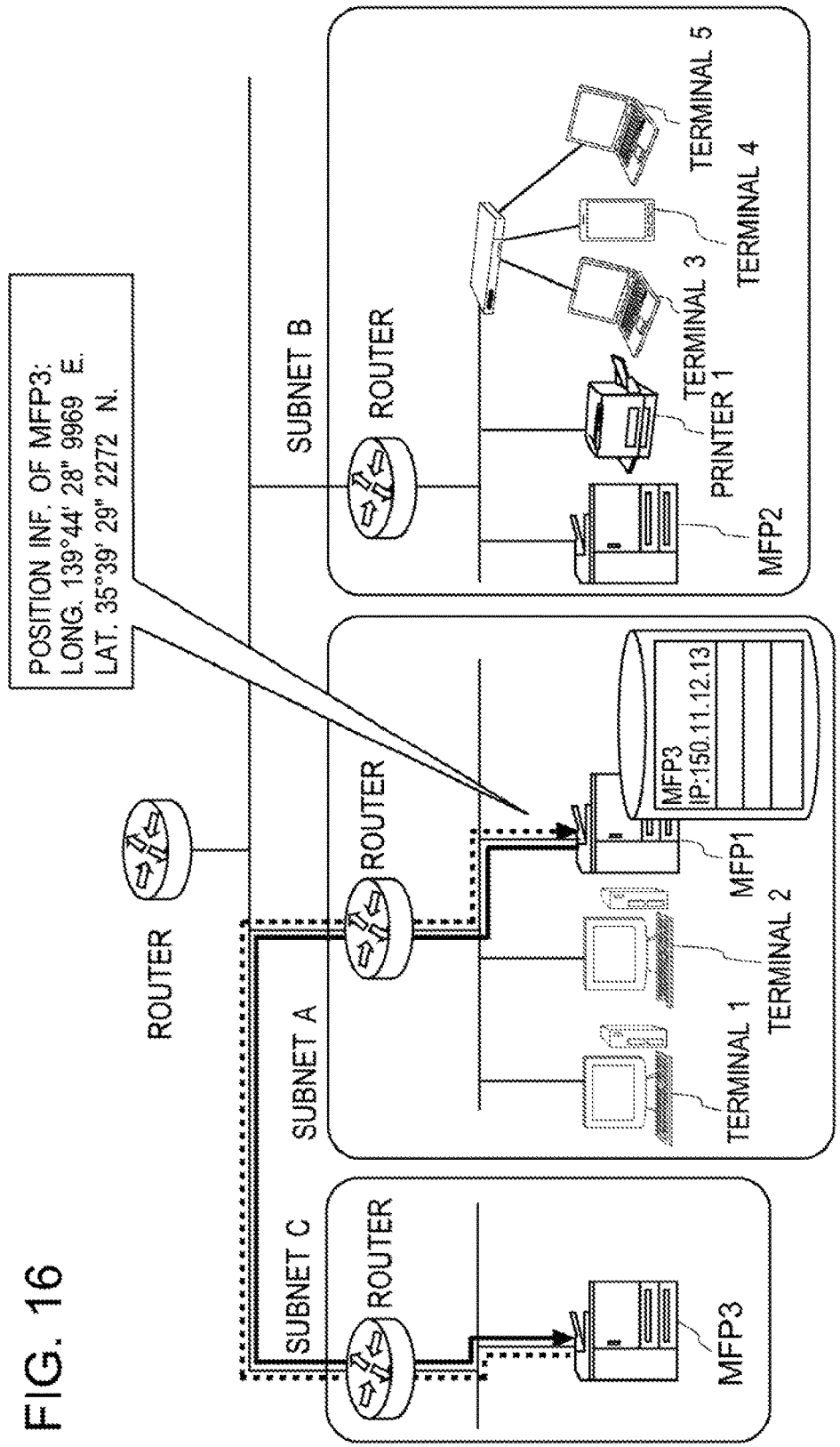
FIG. 16 is a schematic diagram for describing an apparatus searching method for use in a printing system according to one embodiment of the present invention.

Next, as illustrated in FIG. 16, control unit 41 (position comparing section 49) of MFP1 inquires of the other MFP (MFP3 in subnet C) the position information by using the IP address stored in S102, and obtains the position information from MFP3 (S107). Then, when receiving the position information from both terminal 4 being the sender of the search packet and MFP3 (YES in S108), control unit 41 obtains the position information of itself (MFP1) from storage unit 42, and compares respective position information of terminal 4, MFP1 and MFP3. In concrete terms, as illustrated in FIG. 17, control unit 41 (position comparing section 49) of MFP1 obtains the position information of terminal 4 being 139° 44' 28" 8869 east longitude and 35° 39' 29" 1572 north latitude; the position information of MFP3 being 139° 44' 28" 9969 east longitude and 35° 39' 29" 2272 north latitude; and the position information of itself (MFP1) being 139° 44' 28" 9369 east longitude and 35° 39' 29" 1872 north latitude. Accordingly, a difference in the position information between terminal 4 and MFP1 becomes 0° 0' 0" 500 in longitude and 0° 0' 0" 300 in latitude; and a difference in the position information between terminal 4 and MFP3 becomes 0° 0' 0" 1100 in longitude and 0° 0' 0" 700 in latitude.

Next, control unit 41 (packet forwarding section 50) of MFP1 judges whether terminal 4 is closer to MFP3 than to itself (MFP1) (S110). When judging that terminal 4 is closer to MFP3 than to itself (MFP1) (YES in S110), control unit 41 (packet forwarding section 50) of MFP1 forwards the forwarding packet to MFP3 (S111). When judging that terminal 4 is closer to itself (MFP1) than to MFP3 as in the example of FIG. 16 (NO in S110), control unit 41 (packet forwarding section 50) of MFP1 omits forwarding the forwarding packet to MFP3. As a result, MFP3 is not displayed on the list screen on terminal 4, and a print job is not sent from terminal 4 to MFP3 located farther from terminal 4 than MFP1.

As described above, in response to receiving a forwarding packet from image forming apparatus 40 in a certain subnet, image forming apparatus 40 in another subnet may perform the packet forwarding processing as follows, in place of the responding processing which sends a response to a search packet to the address information of client terminal 30. In advance to the responding processing, image forming apparatus 40 in another subnet registers the address information of image forming apparatus in the other subnet, and in the responding processing, image forming apparatus 40 in another subnet forwards the forwarding packet to the address information of the registered image forming apparatus 40. When receiving the forwarding packet, image forming apparatus 40 in the other subnet extracts the information that the search packet has been sent and the IP address of client terminal 30 from the forwarding packet, and sends a response to the search packet directly to the IP address information of cheat terminal being the sender of the search packet. It makes client terminal 30 possible to allow a user to send print instructions also to image forming apparatus 40 located in the other subnet, in response to receiving a response or responses to the searching packet. Furthermore, when the image forming apparatus 40 in another subnet that received a forwarding packet from the image forming apparatus in the certain subnet, finds image forming apparatus 40 closer to client terminal 30 being the sender of the search packet than other image forming apparatuses 40, the image forming apparatus 40 in another subnet may forward the forwarding packet to the image forming apparatus 40 which was found. Thereby, after receiving a response to the search packet from image forming apparatus 40 closer to itself (client terminal 30) among image forming apparatuses in plural subnets the client terminal 30 can allow a user to send print instructions to this image forming apparatus 40.

The present invention should not be limited to the description in the above-mentioned examples, and the constitution and control may be modified appropriately unless the modification deviates from the intention of the present invention.

For example, in one of the above-mentioned examples, the description has been given to the case where image forming apparatus 40 receives a search packet and then sends a forwarding packet. However, the apparatus searching method of the present invention can be applied similarly to a case where an arbitrary information processing apparatus capable of receiving a search packet at any time (in other words, its power source is always set to ON) receives a search packet and then sends a forwarding packet.

The present invention can be used in a printing system that includes an information processing apparatus and at least one image forming apparatuses located in different subnetworks, an apparatus searching method of searching for an image forming apparatus located in a different subnetwork, an apparatus searching program to be executed in each or the information processing apparatus and the image forming apparatus, and a non-transitory recording medium storing the apparatus searching program.

Although embodiments of the present invention have been described and illustrated in detail, it is clearly understood that the same is by way of illustration and example only and not limitation, the scope of the present invention should be interpreted by terms of the appended claims.

The invention claimed is:
1. A printing system for use in a network including a first subnetwork anti a second subnetwork, the printing system comprising:
  a client terminal located in the first subnetwork;
  an information processing apparatus located in the first subnetwork; and
  a first image forming apparatus located to the second subnetwork,
  wherein the information processing apparatus includes a hardware processor that performs:
  registering address in formation of the first image forming apparatus;
  receiving, from the client terminal, a search packet being a packet for searching for an image forming apparatus in the printing system in a multicast manner; and performing packet forwarding including
obtaining, from the search packet, address information of the client terminal being a sender of the search packet, to create a forwarding packet including information that the search packet has been sent and the address information of the client terminal, and
sending the forwarding packet to the address information of the first image forming apparatus, and
wherein the first image forming apparatus includes
a hardware processor that performs:
receiving the forwarding packet from the information processing apparatus; and
responding to the search packet by extracting the information that the search packet has been sent and the address information of the client terminal from the forwarding packet and by sending a response to the search packet to the address information of the client terminal, and
a printing unit that prints a print job sent from the client terminal in response to the client terminal receiving the response to the search packet;
wherein the information processing apparatus further includes a storage unit storing position information of the information processing apparatus, and
the hardware processor of the information processing apparatus further performs:
obtaining, from the client terminal and the first image forming apparatus, respective position information;
obtaining, front the storage unit, the position information of the information processing apparatus;
comparing the position information of the client terminal, the position information of the information processing apparatus and the position information of the first image forming apparatus; and
on performing the packet Forwarding, sending the forwarding packet to the address information of the first image forming apparatus in response to judging that the client terminal is closer to the first image forming apparatus than to the information processing apparatus.

2. The printing system of claim 1 further comprising a second image forming apparatus located in a third subnetwork in the network, the third subnetwork being different from the first subnetwork and the second subnetwork,
wherein the hardware processor of the first image forming apparatus performs, in place of the responding to the search packet;
registering address information of the second image forming apparatus; and
forwarding the forwarding packet to the address information of the second image forming apparatus, and
the second image forming a apparatus includes
a hardware processor that performs:
receiving the forwarding packet from the first image forming apparatus; and
responding to the search packet by extracting the information that the search packet has been sent and the address information of the client terminal from the forwarding packet and by sending a response to the search packet to the address information of the client terminal, and
a printing unit that prints a print job sent from the client terminal in response to the client terminal receiving the response to the searching packet.

3. The printing system of claim 2,
wherein the first image forming apparatus further includes a storage unit storing position information of the first image forming apparatus, and
the hardware processor of the first image forming apparatus further performs:
obtaining, from the client terminal and the second image framing apparatus, respective position information;
obtaining, from the storage unit of the first image forming apparatus, the position information of the first image forming apparatus;
comparing the position information of the client terminal, the position information of the first image forming apparatus and the position information of the second image forming apparatus; and
on forwarding the forwarding packet, sending the forwarding packet to the address information of the second image forming apparatus in response to judging that the client terminal is closer to the second image forming apparatus than to the first image forming apparatus.

4. The printing system of claim 2,
wherein the hardware processor of the second image forming apparatus performs, on receiving the forwarding packet including same information a plurality of times, omitting the responding to the search packet in response to receiving the forwarding packet a second or subsequent time.

5. The printing system of claim 1,
wherein the hardware processor of the first image forming apparatus performs, on receiving the forwarding packet including same information a plurality of times, omitting the responding to the search packet in response to receiving the forwarding packet a second or subsequent time.

6. The printing system of claim 1,
wherein the information processing apparatus is an image forming apparatus.

7. A method of searching for an apparatus in a printing system for use in a network including a first subnetwork and a second subnetwork, the printing system comprising a client terminal and information processing apparatus located in the first subnetwork and a first image forming apparatus located in the second subnetwork, the method comprising:
registering address information of the first image forming apparatus by the information processing apparatus;
receiving, from the client terminal a search packet being a packet for searching for an image forming apparatus in the printing system in a multicast manner, by the information processing apparatus;
performing packet forwarding by life information processing apparatus, including
obtaining, from the search packet, address information of the client terminal being a sender of foe search packet, to create a forwarding packet including in formation that the search packet has been sent and the address information of the client terminal, and
sending the forwarding packet to the address information of the first image forming apparatus;
receiving the forwarding packet from the information processing apparatus, by the first image forming apparatus;
responding, by the first image forming apparatus, to the search packet by extracting the information that the search packet has been sent and the address information of the client terminal from the forwarding packet and by sending a response to the search packet to the address information of the client terminal; and
allowing, by the client terminal, a user to send a print instruction to the first image forming apparatus, in response to the client terminal receiving the response to the searching packet from the first image forming apparatus;
wherein the method further comprising:
obtaining, from the client terminal and the first image forming apparatus, respective position information, by die information processing apparatus;
obtaining, from a storage unit of the information processing apparatus, position information of the information processing apparatus, by the information processing apparatus;
comparing the position information of the client terminal, the position information of the information processing apparatus and the position information of the first imago forming apparatus, by the information processing apparatus; and
on performing the packet forwarding, sending the forwarding packet to the address information of the first image forming apparatus by the information processing apparatus, in response to judging that the client terminal is closer to the first image forming apparatus than to {fee information processing apparatus.

8. The method of claim 7,
wherein the printing system further comprises a second image forming apparatus located in a third subnetwork in the network, the third subnetwork being different from the first subnetwork and the second subnetwork, and
wherein the method further comprises:
performing operations by the first image forming apparatus, in place of the responding to the search packet, the operations including
registering address information of the second image forming apparatus and
forwarding the forwarding packet to the address information of the second image forming apparatus;
receiving the forwarding packet m the first image forming apparatus, by the second image forming apparatus;
responding, by the second image forming apparatus, to the search packet by extracting information that the search packet has been sent and the address information of the client terminal from the forwarding packet and by sending a response to the search packet to the address information of the client terminal; and
allowing, by the client terminal, a user to send a print instruction to the second image apparatus, in response to the client terminal receiving the response to the searching packet from the second image forming apparatus.

9. The method of claim 8 further comprising:
obtaining, from the client terminal and the second image forming apparatus, respective position information, by the first image forming apparatus;
obtaining, from a storage unit of the first image forming apparatus, position information of the first image forming apparatus, by the first image forming apparatus;
comparing, by the first image forming apparatus, the position information of the client terminal, the position information of the first image forming apparatus and the position information of the second image forming apparatus; and
on forwarding the forwarding packet, sending the forwarding packet to the address information of the second image forming apparatus by the first image forming apparatus, in response to judging that the client terminal is closer to the second image forming apparatus than to the first image forming apparatus.

10. The method of claim 8,
wherein the responding, by the second image forming apparatus, to the search packet includes, on receiving the forwarding packet including same information a plurality of times, omitting the responding to the search packet in response to receiving the forwarding packet a second or subsequent time.

11. The method of claim 7,
wherein the responding, by the first image forming apparatus, to the search packet includes, on receiving the forwarding packet including same information a plurality of times, omitting the responding to the search packet in response to receiving the forwarding packet a second or subsequent time.

12. The method of claim 7,
wherein the information processing apparatus is an image forming apparatus.

13. A non-transitory recording medium storing a computer-readable program for searching for an apparatus in a printing system, the printing system being for use in a network including a first subnetwork and a second subnetwork, the printing system comprising a client terminal and information processing apparatus located in the first subnetwork, and a first image forming apparatus located in the second subnetwork, the computer-readable program comprising instructions which, when executed by a hardware processor of the information processing apparatus, cause the information processing apparatus to perform operations comprising:
registering address information of the first image forming apparatus;
receiving, from the client terminal, a search packet being a packet for searching for an image forming apparatus in the printing system in a multicast manner; and
performing packet forwarding including
obtaining, front the search packet, address information of the client terminal being a sender of the search packet, to create a forwarding packet including information that the search packet has been sent and the address information of the client terminal, and
sending the forwarding packet to the address information of the first image forming apparatus;
wherein the operations further comprise:
obtaining, from the client terminal and the first image forming apparatus, respective position information;
obtaining, from a storage unit of the information processing apparatus, position information of the information processing apparatus;
comparing the position information of the client terminal, the position information of the information processing apparatus and the position information of the first image forming apparatus; and
on performing the packet forwarding, sending the forwarding packet to the address information of the first image forming apparatus in response to judging that the client terminal is closer to the first image forming apparatus than to the information processing apparatus.

14. The non-transitory recording medium of claim 13,
wherein the information processing apparatus is an image forming apparatus.

15. A non-transitory recording medium storing a computer readable program for searching for an apparatus in a printing system, the printing system being for use in a network including a first subnetwork and a second subnetwork, the printing system comprising a client terminal and information processing apparatus located in the first subnetwork and a first image forming apparatus located in the second subnetwork, the computer-readable program comprising instructions which, when executed by a hardware processor of the first image forming apparatus, cause the first image forming apparatus to perform operations comprising:

receiving a forwarding packet from the information processing apparatus, wherein the forwarding packet is created by the information processing apparatus in response to receiving, from the client terminal, a search packet being a packet for searching for an image forming apparatus in the printing system in a multicast manner, and the forwarding packet includes information that the search packet has been sent and the address information of the client terminal; and responding to the search packet by extracting the information that the search packet has been sent and the address information of the client terminal from the forwarding packet and by sending a response to the search packet to the address information of the client terminal;

wherein the operations further comprise:

obtaining, from the client terminal and the second image forming apparatus, respective position information;

obtaining, from a storage unit of the first image forming apparatus, position information of the first image forming apparatus;

comparing the position information of the client terminal, the position information of the first image forming apparatus and the position information of the second image forming apparatus; and on forwarding the forwarding packet, sending the forwarding packet to the address information of the second image forming apparatus in response to judging that the client terminal is closer to the second image forming apparatus than to the first image forming apparatus.

16. The non-transitory recording medium of claim 15, wherein the printing system further comprises a second image forming apparatus located in a third subnetwork in the network, the third subnetwork being different from the first subnetwork and the second subnetwork, and wherein the operations further comprise performing operations in place of the responding to the search packet, including:

registering address information of the second image forming apparatus; and forwarding the forwarding packet to the address information of the second image forming apparatus.

17. The non-transitory recording medium of claim 15, wherein the responding to the search packet includes, on receiving the forwarding packet including same information a plurality of times, omitting the responding to the search packet in response to receiving the forwarding packet a second or subsequent time.

18. The non-transitory recording medium of claim 15, wherein the information processing apparatus is an image forming apparatus.

\* \* \* \* \*